US012631755B2

(12) United States Patent
Dong et al.

(10) Patent No.: US 12,631,755 B2
(45) Date of Patent: May 19, 2026

(54) TIME-OF-FLIGHT TOF SENSOR MODULE AND ELECTRONIC DEVICE

(71) Applicant: HUAWEI TECHNOLOGIES CO., LTD., Shenzhen (CN)

(72) Inventors: Yongjiang Dong, Hangzhou (CN); Fan Wang, Hangzhou (CN); Feng Yu, Hangzhou (CN); Fei Gao, Hangzhou (CN); Honghai Zhang, Grenoble (FR); Fengguang Qu, Dongguan (CN); Dengkuan Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 971 days.

(21) Appl. No.: 17/870,941

(22) Filed: Jul. 22, 2022

(65) Prior Publication Data

US 2022/0365221 A1      Nov. 17, 2022

Related U.S. Application Data

(63) Continuation of application No. PCT/CN2020/134053, filed on Dec. 4, 2020.

(30) Foreign Application Priority Data

Jan. 23, 2020    (CN) .......................... 202010077087.8
Aug. 26, 2020    (CN) .......................... 202010873829.8

(51) Int. Cl.
*G01S 17/00*        (2020.01)
*G01S 7/4865*       (2020.01)
*G01S 17/894*       (2020.01)
(52) U.S. Cl.
CPC .......... *G01S 17/894* (2020.01); *G01S 7/4865* (2013.01)

(58) Field of Classification Search
USPC ........................................................ 356/5.01
See application file for complete search history.

(56) References Cited

U.S. PATENT DOCUMENTS 9,689,667 B2 *   6/2017   Royo Royo ........... G01B 11/22
10,021,284 B2 *   7/2018   Wang ................... H04N 13/133
(Continued)

FOREIGN PATENT DOCUMENTS

CN          102565808 A       7/2012
CN          103502839 A       1/2014
(Continued)

OTHER PUBLICATIONS

International Search Report and Written Opinion issued in PCT/CN2020/134053, dated Feb. 26, 2021, 12 pages.
(Continued)

*Primary Examiner* — James R Hulka

(57) ABSTRACT

A TOF sensor module is disclosed. The TOF sensor module includes a light source, a beam adjustment assembly, and a detection assembly. The light source is configured to emit m first beams at each of M moments, and transmit the m first beams to the beam adjustment assembly. The beam adjustment assembly is configured to: adjust the received m first beams to generate S second beams, project the S second beams to S regions of a detection surface, where projection is performed to M projection points on the detection surface at the M moments respectively, the M projection points are in a same region of the detection surface and have different locations. The detection assembly is configured to receive S optical echo signals from the detection surface at each of the M moments, and convert the S optical echo signals into S electrical echo signals for storage at each moment.

20 Claims, 17 Drawing Sheets

(56) References Cited

U.S. PATENT DOCUMENTS

| | | | |
|---|---|---|---|
| 10,061,019 | B1 | 8/2018 | Campbell et al. |
| 10,114,110 | B2 * | 10/2018 | Imai .................... G01S 17/931 |
| 10,444,359 | B2 * | 10/2019 | Pacala ................... G02B 26/10 |
| 10,488,496 | B2 * | 11/2019 | Campbell ............. G01S 7/4817 |
| 10,527,725 | B2 * | 1/2020 | Pacala ................... H10F 39/18 |
| 11,016,193 | B2 * | 5/2021 | Pacala ................. G01S 7/4817 |
| 11,366,230 | B2 * | 6/2022 | Spickermann ........ G01S 7/4863 |
| 11,500,076 | B2 * | 11/2022 | Keilaf .................. G01S 7/4816 |
| 2014/0049783 | A1 * | 2/2014 | Royo Royo .......... G01S 17/894 |
| | | | 250/208.2 |
| 2016/0274223 | A1 * | 9/2016 | Imai ........................ G01S 17/42 |
| 2017/0064235 | A1 | 3/2017 | Wang et al. |
| 2017/0131388 | A1 * | 5/2017 | Campbell ............. G01S 7/4816 |
| 2019/0011556 | A1 * | 1/2019 | Pacala ................... G02B 27/30 |
| 2019/0011561 | A1 * | 1/2019 | Pacala ................... G02B 26/10 |
| 2019/0064355 | A1 * | 2/2019 | Pacala ................... G01S 17/88 |
| 2019/0271767 | A1 * | 9/2019 | Keilaf .................. G01S 17/931 |
| 2019/0310370 | A1 | 10/2019 | Schmitz |
| 2019/0331769 | A1 * | 10/2019 | Kamada ................. G01S 17/42 |
| 2020/0103526 | A1 * | 4/2020 | Morcom ................ G01S 17/89 |
| 2020/0386872 | A1 * | 12/2020 | Keilaf .................. G01S 7/4815 |
| 2021/0325540 | A1 * | 10/2021 | Spickermann ........ G01S 7/4816 |

FOREIGN PATENT DOCUMENTS

| | | | |
|---|---|---|---|
| CN | 207380241 | U | 5/2018 |
| CN | 109343070 | A | 2/2019 |
| CN | 110018486 | A | 7/2019 |
| CN | 110068831 | A | 7/2019 |
| CN | 110221309 | A | 9/2019 |
| CN | 110268283 | A | 9/2019 |
| CN | 110441785 | A | 11/2019 |
| CN | 110609293 | A | 12/2019 |
| CN | 110658509 | A | 1/2020 |
| CN | 110658529 | A | 1/2020 |
| CN | 110716190 | A | 1/2020 |
| CN | 110719442 | A | 1/2020 |
| CN | 209894976 | U | 1/2020 |
| CN | 110824490 | A | 2/2020 |
| CN | 210090674 | U | 2/2020 |
| CN | 215494140 | U | 1/2022 |
| JP | H08248133 | A | 9/1996 |
| JP | 2009103529 | A | 5/2009 |
| JP | 2016176721 | A | 10/2016 |
| JP | 2018533026 | A | 11/2018 |
| JP | 2019191109 | A | 10/2019 |
| WO | 2018172766 | A1 | 9/2018 |
| WO | 2019010320 | A1 | 1/2019 |
| WO | 2019245719 | A1 | 12/2019 |

OTHER PUBLICATIONS

Office Action issued in CN202010873829.8, dated Jul. 15, 2022, 16 pages.

Office Action issued in JP2022-544647, dated Jun. 6, 2023, with English translation, 12 pages.

Extended European Search Report issued in EP20915917.7, dated Apr. 17, 2023, 8 pages.

* cited by examiner

Projection point
corresponding to
the 1$^{st}$ moment

Projection point
corresponding to
the 2$^{nd}$ moment

Region of a
detection surface

Projection point
corresponding to
the 3$^{rd}$ moment

Projection point
corresponding to
the 4$^{th}$ moment

Partition $\Delta_4$

Emitter $\Delta_1$

Pitch
(pitch)

TIME-OF-FLIGHT TOF SENSOR MODULE AND ELECTRONIC DEVICE

CROSS-REFERENCE TO RELATED APPLICATIONS

This application is a continuation of International Application No. PCT/CN2020/134053, filed on Dec. 4, 2020, which claims priority to Chinese Patent Application No. 202010077087.8, filed on Jan. 23, 2020 and Chinese Patent Application No. 202010873829.8, filed on Aug. 26, 2020. All of the aforementioned patent applications are hereby incorporated by reference in their entireties.

TECHNICAL FIELD

This application relates to the field of sensing technologies, and in particular, to a time-of-flight (TOF) sensor module and an electronic device.

BACKGROUND

With development of informatization, accurate and reliable information needs to be obtained first in a process of using information, and a sensor is a main way and means to obtain information. Currently, sensors have been widely used in many fields, for example, fields such as industrial production, cosmic exploration, ocean exploration, environmental protection, resource surveys, medical diagnosis, and biological engineering. Three-dimensional (3D) sensors are a hot topic under research in the sensor field.

Technologies applicable to the 3D sensors mainly include stereoscopic imaging, structured light, time-of-flight (TOF) detection, and the like. TOF has advantages such as a long detection distance and a high resolution, and is an important technology used by the 3D sensors. Conventional TOF detection is mainly classified into a single-time full-projection TOF camera and a scanning device-based TOF scanner. The scanning device-based TOF scanner has a relatively high spatial resolution, but imposes a relatively high requirement on precision of a scanning angle, and requires a complex scanning structure, making it difficult to miniaturize a TOF sensor module. The single-time full-projection TOF camera has advantages of a high detection speed and a large field of view (FOV), but is limited by a detection element array, power consumption, and a maximum quantity of configurable memories of a sensor. A maximum size of an array of detection elements, of a detector, that can be simultaneously started is 160×120, thereby limiting a resolution of a formed image.

SUMMARY

This application provides a TOF sensor module and an electronic device, to resolve a problem in a conventional technology that an image resolution is low due to a limitation by a maximum quantity of detection elements that can be simultaneously started.

According to a first aspect, this application provides a TOF sensor module. The TOF sensor module includes a light source, a beam adjustment assembly, and a detection assembly. The light source is configured to emit m first beams at each of M moments, and transmit the m first beams to the beam adjustment assembly. The beam adjustment assembly is configured to: after adjusting the received m first beams into S second beams, project the S second beams to S regions of a detection surface, where the S regions are in a one-to-one correspondence with the S second beams, and M projection points that are in a same region of the detection surface and to which projection is performed at the M moments respectively have different locations. The detection assembly is configured to receive S optical echo signals from the detection surface at each of the M moments, and convert the S optical echo signals into S electrical echo signals for storage at each moment, where the S optical echo signals are in a one-to-one correspondence with the S second beams, each optical echo signal is a signal obtained by reflecting a corresponding second beam by the detection surface, both m and M are integers greater than 1, and S is an integer greater than m.

Based on the TOF sensor module, the light source emits m first beams separately at different times, and M projection points that are in a same region of the detection surface and to which projection is performed at the M moments respectively have different locations. This is equivalent to performing M scans on each region of the detection surface. The detection assembly may simultaneously start S detection elements at each moment to receive S optical echo signals, and may receive a total of M×S optical echo signals at the M moments. In this way, image information can be determined based on the M×S optical echo signals, thereby helping increase a resolution of a formed image. If S=160×120, a determined image resolution may be M×160×120. When M=4×4, the determined image resolution may be 640×480. In other words, based on a capability (160×120 detection elements can be simultaneously started at most) of a conventional sensor, the TOF sensor module can form an image with a resolution of 640×480 or higher by reusing S detection elements at different times. This helps avoid a problem that a resolution of an image formed by the TOF sensor module is relatively low due to a limitation by a maximum quantity of detection elements that can be simultaneously started.

In a possible implementation, the detection assembly may include K detection elements, where K is an integer greater than or equal to S, and the detection assembly is configured to power on S detection elements of the K detection elements at each of the M moments. In other words, S detection elements of the K detection elements may be selected at each of the M moments. By powering on S detection elements in the detection assembly at each of the M moments, power consumption of the detection assembly can be reduced while a low image resolution caused by the limitation by the maximum quantity of detection elements that can be simultaneously started is addressed.

Further, optionally, the TOF sensor module further includes a processing circuit, and the processing circuit is configured to obtain, from the detection assembly, M×S electrical echo signals obtained at the M moments, and determine image information based on the M×S electrical echo signals. This helps avoid the limitation by the maximum quantity of detection elements that can be simultaneously started in the detection assembly, thereby increasing a determined image resolution.

In this application, S may be equal to m×n, and the beam adjustment assembly may be configured to adjust transmission directions of the received m first beams, split each of adjusted m first beams into n second beams to obtain m×n second beams, and project the m×n second beams to m×n regions of the detection surface, where the m×n regions are in a one-to-one correspondence with the m×n second beams, and n is an integer greater than 1. The m×n second beams are projected to the m×n regions of the detection surface, so that each region of the detection surface can be scanned, and a super-resolution effect can be achieved.

In a possible implementation, the detection assembly may include m×n detection elements, and the m×n detection elements are in a one-to-one correspondence with the m×n regions. Each of the m×n detection elements is configured to receive an optical echo signal from a corresponding region at each of the M moments, and convert the optical echo signal from the corresponding region into an electrical echo signal for storage at each moment. In this way, a resolution of an image of the TOF sensor module can be increased when the detection assembly includes a relatively small quantity of detection elements. In addition, the detection assembly includes a relatively small quantity of detection elements, thereby facilitating miniaturization of the TOF sensor module.

This application provides the following two possible TOF sensor modules as examples.

Example 1

The light source includes M light source partitions, and each light source partition includes m emitters. m emitters in one of the M light source partitions are configured to emit m first beams at each of the M moments, where a light source partition used to emit m first beams at each of the M moments varies. In this way, the light source can emit m first beams at each of the M moments.

Further, optionally, the beam adjustment assembly includes a collimation assembly and a beam splitting assembly. The collimation assembly is configured to adjust an included angle between any two adjacent first beams of the m first beams into a first angle, and transmit the adjusted m first beams to the beam splitting assembly, where the first angle is determined based on a total field of view corresponding to the detection surface and a quantity m×n of second beams. The beam splitting assembly is configured to split each of the adjusted m first beams into n second beams.

In a possible implementation, if the total field of view corresponding to the detection surface is 64×48, when the quantity of second beams is equal to 160×120, the first angle is equal to $(64/160) \times (48/120) = 0.4 \times 0.4$ degrees.

In a possible implementation, the M light source partitions may be an $M_1 \times M_2$ array. In a horizontal direction of the $M_1 \times M_2$ array, an included angle between first beams emitted by two adjacent emitters in two adjacent light source partitions is greater than or equal to an angle corresponding to an interval of $M_1$ projection points on the detection surface. In a vertical direction of the $M_1 \times M_2$ array, an included angle between first beams emitted by two adjacent emitters in two adjacent light source partitions is greater than or equal to an angle corresponding to an interval of $M_2$ projection points on the detection surface. Both $M_1$ and $M_2$ are integers greater than 1.

In a possible implementation, the detection assembly may include m×n detection elements. Each of the m×n detection elements is powered on at each of the M moments. Each of the m×n detection elements is configured to receive an optical echo signal from a corresponding region at each of the M moments, and convert the optical echo signal from the corresponding region into an electrical echo signal for storage at each moment.

Example 2

The light source includes P emitters, where P is an integer greater than m. m emitters of the P emitters emit m first beams at preset intervals at each moment, where m emitters used to emit m first beams at each of the M moments vary. In this way, the light source can emit m first beams at each of the M moments.

In an optional implementation, the beam adjustment assembly includes a collimation assembly and a beam splitting assembly. The collimation assembly is configured to adjust an included angle between any two adjacent first beams of the m first beams into a second angle, and transmit the adjusted m first beams to the beam splitting assembly, where the second angle is determined based on a total field of view corresponding to the detection surface and a quantity m of started light sources. The beam splitting assembly is configured to split each of the adjusted m first beams into n second beams.

In a possible implementation, if the total field of view corresponding to the detection surface is 64×48, when the quantity m of started emitters is equal to $m_1 \times m_2$, the second angle is equal to $(64/m_1) \times (48/m_2)$. To be specific, the second angle is $(64/m_1)$ degrees in a horizontal direction, and is $(48/m_2)$ degrees in a vertical direction.

In a possible implementation, the detection assembly may power on each of m×n detection elements at each of the M moments. Each of the m×n detection elements is configured to receive an optical echo signal from a corresponding region at each of the M moments, and convert the optical echo signal from the corresponding region into an electrical echo signal for storage at each moment.

In a possible implementation, the M light source partitions are integrally molded. In this way, it can be ensured that the M light source partitions are on a same plane. In addition, a size of the integrally molded M light source partitions is relatively small, thereby facilitating miniaturization of the TOF sensor module.

According to a second aspect, this application provides a TOF sensor module. The TOF sensor module includes a light source, a beam adjustment assembly, and a detection assembly. The light source is configured to emit m first beams at each of M moments, and transmit the m first beams to the beam adjustment assembly, where both m and M are integers greater than 1. The beam adjustment assembly is configured to: after adjusting transmission directions of the received m first beams, project adjusted m first beams to a corresponding region of a detection surface, where a projection point that is on the detection surface and to which projection is performed at each of the M moments is located in a separate region. The detection assembly is configured to receive m optical echo signals from the corresponding region of the detection surface at each of the M moments, and convert the m optical echo signals into m electrical echo signals for storage at each moment, where the m optical echo signals are in a one-to-one correspondence with the m first beams, and each optical echo signal is a signal obtained by reflecting a corresponding first beam by the detection surface.

Based on the TOF sensor module, at each of the M moments, after m first beams emitted by the light source are adjusted by the beam adjustment assembly, the m first beams cover one region of the detection surface. The light source emits m first beams separately at different times, and a corresponding detection element in the detection assembly is selected, thereby resolving a problem that 160×120 detection elements can be simultaneously started at most.

In a possible implementation, the light source includes M light source partitions, each light source partition includes m emitters, and the M light source partitions are in a one-to-one correspondence with M regions. m emitters in one of the M light source partitions are configured to emit m first beams at each of the M moments, where a light source partition used to emit m first beams at each of the M moments varies.

In a possible implementation, the detection assembly includes M detection element regions, the M detection element regions are in a one-to-one correspondence with the M light source partitions, each detection element region includes a plurality of detection elements, and each detection element region is configured to receive optical echo signals obtained by reflecting, by the detection surface, beams emitted by a light source partition corresponding to the detection element region. The detection assembly is configured to power on, at each of the M moments, only each detection element in a detection element region of the M detection element regions that corresponds to the light source partition used to emit the m first beams. At each of the M moments, only one of the M detection element regions is powered on, and other detection element regions are not powered on. In this way, only some detection element regions may be enabled to operate, thereby helping reduce power consumption of the detection assembly.

In a possible implementation, the beam adjustment assembly is configured to adjust the transmission directions of the m first beams, and uniformly project the m first beams to the corresponding region. By uniformly projecting the m first beams to the corresponding region of the detection surface, the corresponding region of the detection surface can be uniformly scanned, thereby helping improve accuracy of determined image information.

In a possible implementation, the M light source partitions are integrally molded. In this way, it can be ensured that the M light source partitions are on a same plane. In addition, a size of the integrally molded M light source partitions is relatively small, thereby facilitating miniaturization of the TOF sensor module.

In a possible implementation, a light pipe is disposed between the beam adjustment assembly and each of the M light source partitions. The light pipe is configured to homogenize the received m first beams. This prevents the beam adjustment assembly from being close to the light source partitions, thereby improving utilization of the beam adjustment assembly, and helping reduce difficulty of assembling the TOF sensor module.

According to a third aspect, this application provides an electronic device. The electronic device may include the TOF sensor module described in the first aspect or the second aspect, and a fixing assembly. The fixing assembly is configured to fix the TOF sensor module.

DESCRIPTION OF EMBODIMENTS

To make the objectives, technical solutions, and advantages of this application clearer, the following further describes this application in detail with reference to the accompanying drawings.

In the following, some terms in this application are described, to help a person skilled in the art have a better understanding.

1. Spatial Resolution

The spatial resolution is a minimum distance between two adjacent objects that can be recognized in an image, and is used to represent an index of distinguishing details of a target object in the image. The spatial resolution is one of important indexes to evaluate sensor performance, and is also an important basis for recognizing a shape and a size of an object. The spatial resolution is usually represented by a size of an image element, an image resolution, or a field of view. The image element is a grid cell formed by discretizing ground information, and the image element is a smallest area that can be distinguished in a scanning image. The image resolution is represented by a line width that can be distinguished within a unit distance, or by a quantity of parallel lines at equal intervals. The field of view (IFOV) is a light receiving angle or an observation view of a single detection element (for example, a pixel) in a sensor, and is also referred to as an angular resolution of the sensor, and a unit is a milliradian (mrad) or a microradian (μrad). The field of view β is related to a wavelength k and an aperture D of a collector: β=λ/2D. A smaller field of view indicates a higher spatial resolution.

2. Image Resolution

The image resolution is an amount of information stored in an image, and is a quantity of pixels in each inch of the image. A unit of a resolution is pixels per inch (PPI). It should be understood that a field of view of each pixel is equal to a total field of view corresponding to a detection surface divided by a total quantity of pixels in a sensor.

3. Video Graphics Array (VGA)

The VGA is a standard of a display resolution, and a corresponding resolution is 640×480.

4. Diffractive Optical Element (DOE)

The DOE is also referred to as a binary optical device. Beam splitting by the DOE is implemented by using a diffraction principle. A plurality of diffraction orders may be generated after a beam passes through the DOE. Each order corresponds to one beam. The DOE can implement one-dimensional beam splitting, two-dimensional beam splitting, or the like by using a specific surface structure design. The two-dimensional beam splitting means that the DOE may separately perform beam splitting in each of two directions (for example, a horizontal direction and a vertical direction). For example, the DOE splits a 1×1 beam into 16×12 beams. This means that the DOE splits one beam into 16 beams in the horizontal direction, and splits one beam into 12 beams in the vertical direction.

Figure 1A:
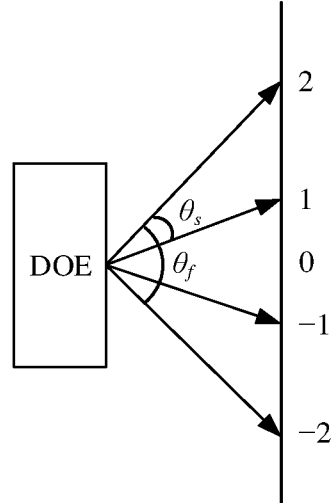
FIG. 1a is a schematic diagram of a beam splitting process of a DOE according to this application.

FIG. 1a is a schematic diagram of a beam splitting process of the DOE according to this application. In FIG. 1a, an example in which the DOE splits one beam into four beams is used, where ±1 and ±2 indicate diffraction orders. θ_f indicates a full angle, and θ_s indicates a separation angle. It can be understood that, by designing a structure of the DOE, some diffraction orders can be suppressed. In FIG. 1a, orders 0 and ±3 are suppressed.

5. Single-Photon Avalanche Diode (SPAD)

Figure 1B:
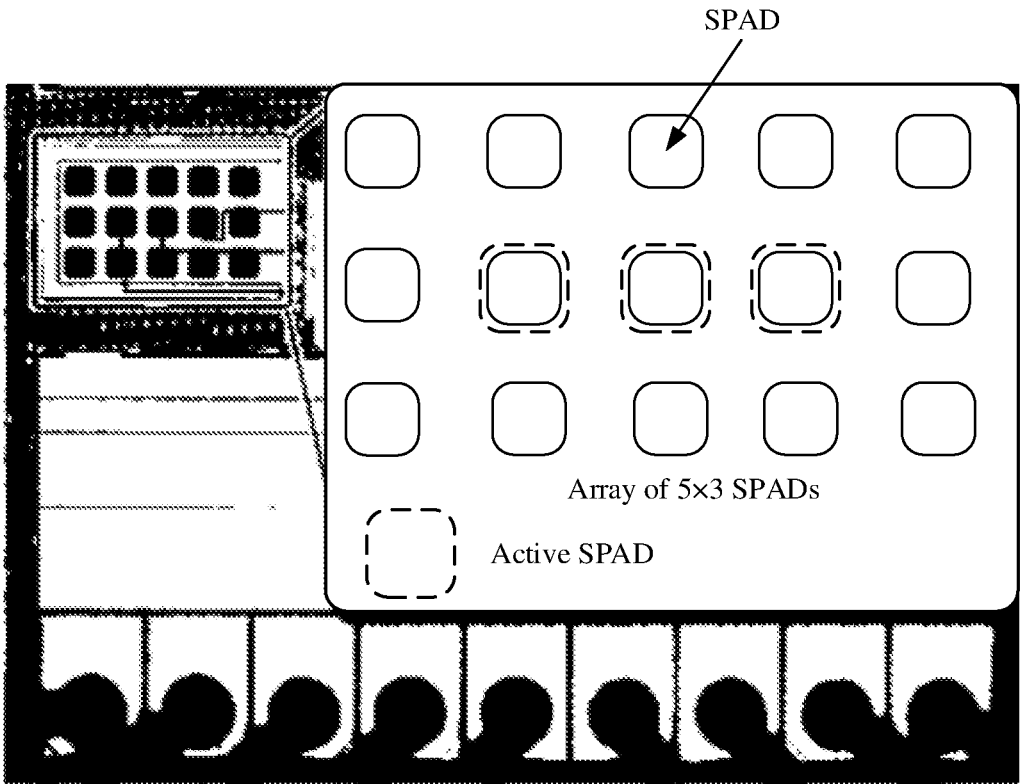
FIG. 1b is a schematic diagram of a structure of a detector according to this application.

The SPAD is also referred to as a single-photon detector, and is a photoelectric detection avalanche diode with a single-photon detection capability. The SPAD has relatively high sensitivity, and is triggered upon detection of one photon. After being triggered, the SPAD usually requires approximately 10 ns to be restored to an initial state. Therefore, the SPAD may be configured to detect presence of photons, but cannot detect a quantity of photons. Usually, there are a plurality of SPADs in each detector in an image sensing system. For example, FIG. 1b is a schematic diagram of a structure of a possible detector. The detector may include an array of 5×3 SPADs. In other words, an array of 5×3 SPADs may constitute a schematic diagram of a structure of a detector. In a possible case, all the 5×3 SPADs may be selected. In another possible case, some of the 5×3 SPADs may be alternatively selected. In FIG. 1b, an active SPAD is a currently selected SPAD.

In this application, a TOF sensor module may be applied to an electronic device, for example, a mobile phone; or may be applied to fields such as vehicle-mounted laser radars, self-driving, unmanned aerial vehicles, internet of vehicles, and security surveillance. The TOF sensor module transmits an electromagnetic wave and receives an electromagnetic wave (namely, an optical echo signal) scattered by a target object, and compares and analyzes the received optical echo signal and the transmitted electromagnetic wave, to extract information related to the target object, such as a distance from the target object, for another example, to form an image of the target object, and for another example, to obtain three-dimensional point cloud density of the target object.

Figure 2:
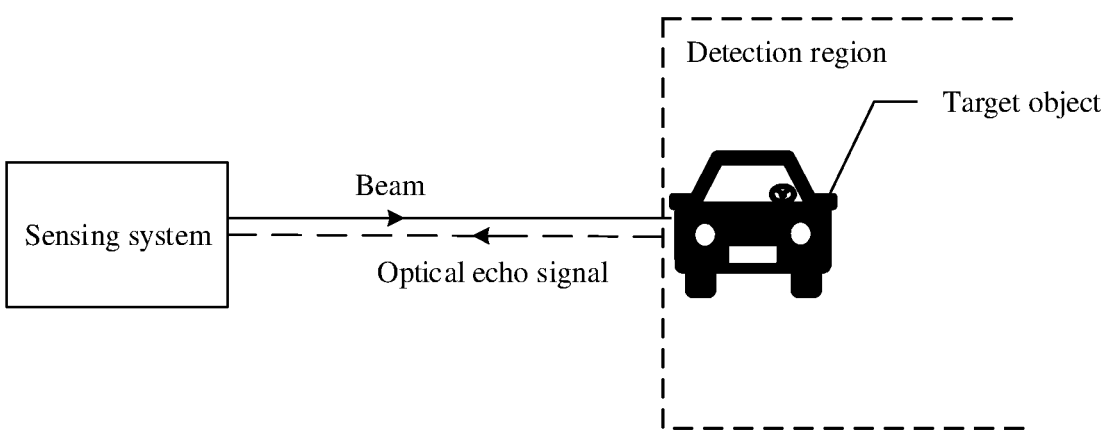
FIG. 2 is a schematic diagram of an operating principle of a TOF sensor module according to this application.

FIG. 2 is a schematic diagram of an operating principle of a TOF sensor module according to this application. The TOF sensor module may include a laser and a detector. The laser is configured to emit a beam and transmit the beam to a detection region. The detection region may include a target object. The beam is reflected after being transmitted to a detection surface (that is, a surface on which the target object receives light) of the detection region (namely, the target object). A reflected signal is returned to the detector as an optical echo signal. The detector may determine, based on the received optical echo signal and the emitted beam, related information of the detection surface, for example, a distance from the TOF sensor module, and for another example, image information of the detection surface. With reference to FIG. 1b, the TOF sensor module is limited by a maximum quantity of detection elements that can be simultaneously started in the detector. The detection element is an element configured to detect a reflected optical echo signal. For example, when the detection element of the detector may include an SPAD and a time-to-digital converter (TDC), 160×120 detection elements can be simultaneously started at most in the detector, thereby causing a problem that a resolution of a formed image is relatively low. The detection element may also be referred to as a pixel, a photosensitive element, a light-sensitive element, or an optical detection element.

In view of the foregoing problem, this application provides a TOF sensor module. A detection assembly in the TOF sensor module may receive optical echo signals from a detection surface at different times, and determine image information based on the optical echo signals received at different times, to increase a resolution of a formed image.

The following describes in detail the TOF sensor module provided in this application with reference to FIG. 3 to FIG. 11e.

Figure 3:
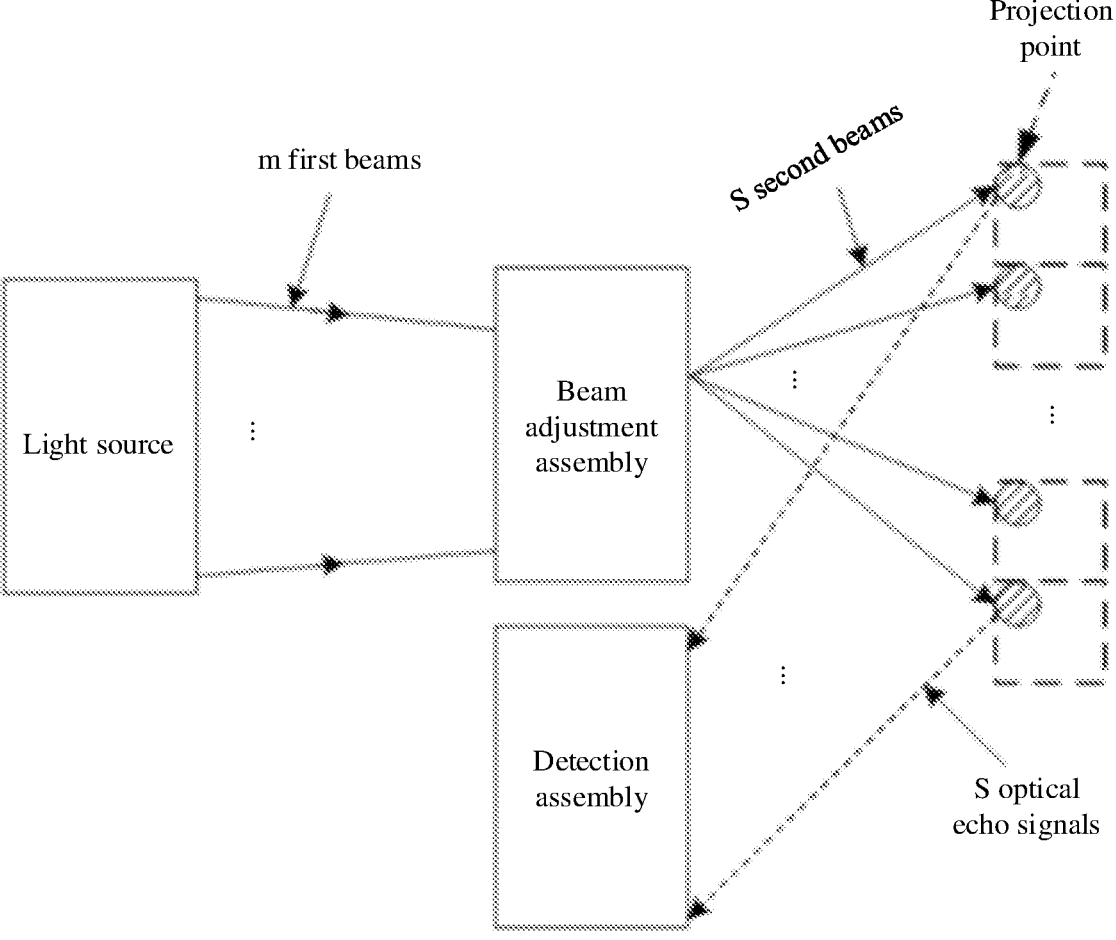
FIG. 3 is a schematic diagram of a structure of a TOF sensor module according to this application.

FIG. 3 is a schematic diagram of a structure of a TOF sensor module according to this application. The TOF sensor module may include a light source, a beam adjustment assembly, and a detection assembly. The light source is configured to emit m first beams at each of M moments, and transmit the m first beams to the beam adjustment assembly, where both m and M are integers greater than 1. This can also be understood as that the light source is configured to emit m first beams at an i^{th} moment, where i is each integer in a closed interval [1, M]. The beam adjustment assembly is configured to: after adjusting the received m first beams into S second beams, project the S second beams to S regions of a detection surface, where the S regions are in a one-to-one correspondence with the S second beams. For a same region of the detection surface, one moment corresponds to one projection point, and M projection points that are in a same region of the detection surface and to which projection is performed at the M moments respectively have different locations. The detection assembly is configured to receive S optical echo signals from the detection surface at each of the M moments, and convert the S optical echo signals into S electrical echo signals for storage at each moment, where the S optical echo signals are in a one-to-one correspondence with the S second beams, and each optical echo signal is a signal obtained by reflecting a corresponding second beam by the detection surface. It should be understood that a location of the detection assembly in the TOF sensor module is any possible location at which an optical echo signal can be received. FIG. 3 shows only an example. For another example, a semi-transparent and semi-reflective mirror may be used to transmit a first beam to the beam adjustment assembly, and reflect a corresponding optical echo signal to the detection assembly.

Figure 4:
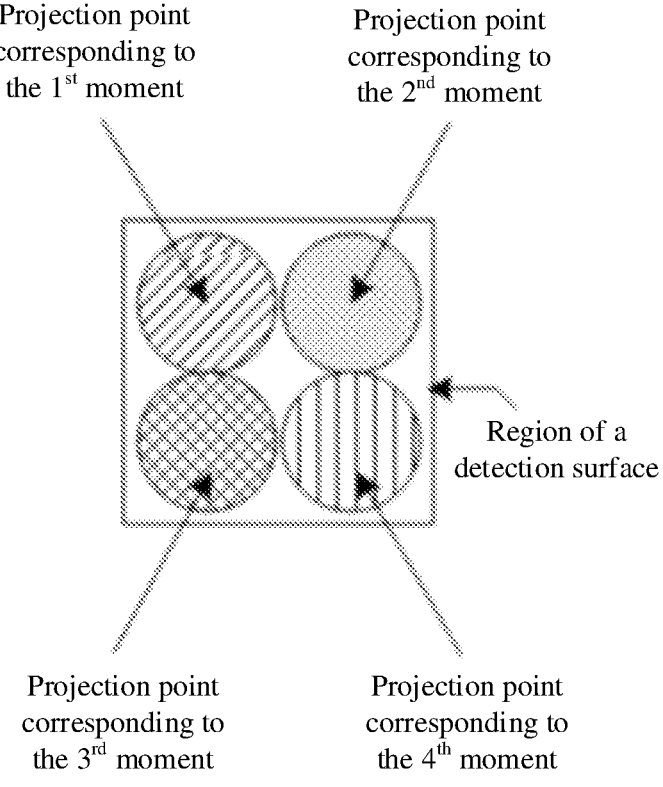
FIG. 4 is a schematic diagram of locations of projection points in one region of a detection surface at four moments according to this application.

For example, M=4, and FIG. 4 is a schematic diagram of locations of four projection points that are in a same region of the detection surface and to which the light source is projected at four moments respectively. The locations of the four projection points in the region of the detection surface are different. Further, optionally, the four projection points may cover the region. In this way, an effect of scanning the detection surface can be achieved without a scanning element. It should be noted that a sequence of the projection points at the four moments in FIG. 4 is an example. This is not limited in this application.

Based on the TOF sensor module, the light source is configured to emit m first beams separately at different times, and M projection points that are in a same region of the detection surface and to which projection is performed at the M moments respectively have different locations. This is equivalent to performing M scans on each region of the detection surface. The detection assembly may simultaneously start S detection elements at each moment to receive S optical echo signals, and may receive a total of M×S optical echo signals at the M moments. In this way, image information can be determined based on the M×S optical echo signals, thereby helping increase a resolution of a formed image. If S=160×120, a determined image resolution may be M×160×120. When M=4×4, the determined image resolution may be 640×480. In other words, based on a capability (160×120 detection elements can be simultaneously started at most) of a conventional sensor, the TOF sensor module can form an image with a resolution of 640×480 or higher by reusing S detection elements at different times. This helps avoid a problem that a resolution of an image formed by the TOF sensor module is low due to a limitation by a maximum quantity of detection elements that can be simultaneously started.

It should be noted that the image information in this application is depth image information, for example, a distance between the detection surface and the TOF sensor module, and an orientation, a height, a velocity, a posture, and a shape of a target on the detection surface.

The following separately describes functional components and structures shown in FIG. 3, to provide specific example implementation solutions.

1. Light Source

In this application, an emitter may be a laser, for example, a vertical cavity surface emitting laser (VCSEL) or an edge emitting laser (EEL). A size of a pitch (with reference to FIG. 5a) between VCSEL-based emitters is 30 μm, and a size of a pitch between EEL-based emitters is 50 μm. The EEL-based emitter may implement independent addressing. The independent addressing means that any emitter in a light source may be independently selected (or referred to as lit, started, or powered on), and the selected emitter may be configured to emit a first beam.

Based on an arrangement manner and a lighting manner of emitters, the following provides two possible cases as examples.

Case 1: The light source includes M light source partitions, each light source partition includes m emitters, and a manner of lighting an emitter by using a light source partition is used.

That the light source includes M light source partitions may be understood as that the light source is divided into M partitions.

Based on the case 1, an implementation of emitting, by the light source, m first beams at each of the M moments may be as follows: m emitters in one of the M light source partitions are configured to emit m first beams at each of the M moments, where a light source partition used to emit m first beams at each of the M moments varies.

This may also be understood as that, based on the case 1, m emitters in one light source partition are started at one moment, and the started m emitters are configured to separately emit first beams, to obtain the m first beams. It should be noted that the M light source partitions may be sequentially started at the M moments. To be specific, the $1^{st}$ light source partition is started at the $1^{st}$ moment, the $2^{nd}$ light source partition is started at the $2^{nd}$ moment, and so on. Alternatively, the M light source partitions may be randomly started. This is not limited in this application.

Figure 5A:
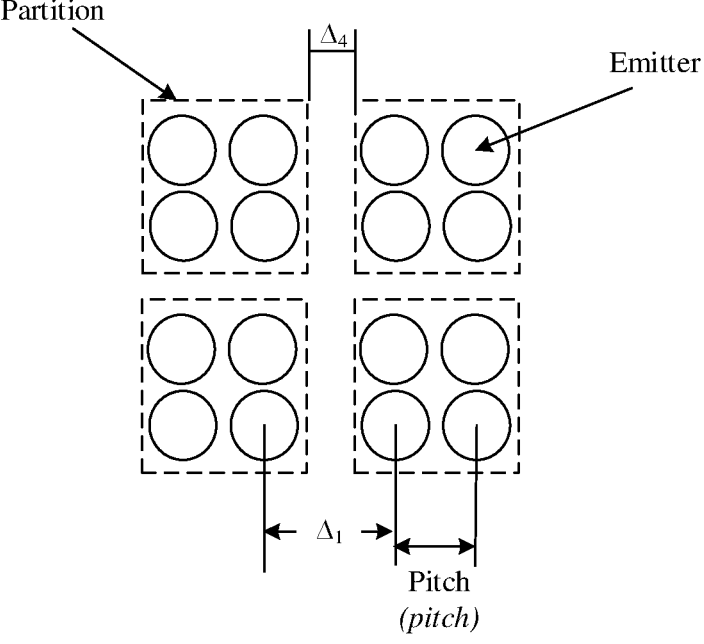
FIG. 5a is a schematic diagram of a structure of a light source according to this application.

In this application, the M light source partitions may be an $M_1 \times M_2$ array, where both $M_1$ and $M_2$ are integers greater than 1, and $M_1$ and $M_2$ may be equal or unequal. For example, the M light source partitions may be alternatively arranged in one row with M columns or one column with M rows. This is not limited in this application. FIG. 5a is a schematic diagram of a structure of a light source according to this application. In FIG. 5a, for example, the light source includes 2×2 light source partitions, and each light source partition may include m emitters. The m emitters in the light source partition may be an $m_1 \times m_2$ array, where both $m_1$ and $m_2$ are integers greater than or equal to 1. In FIG. 5a, for example, $m_1 \times m_2 = 2 \times 2$. Emitters in one light source partition are started at each of the M moments. For example, 2×2 emitters in a light source partition in the $1^{st}$ row and the $1^{st}$ column are started at the $1^{st}$ moment, 2×2 emitters in a light source partition in the $1^{st}$ row and the $2^{nd}$ column are started at the $2^{nd}$ moment, 2×2 emitters in a light source partition in the $2^{nd}$ row and the $1^{st}$ column are started at the $3^{rd}$ moment, and 2×2 emitters in a light source partition in the $2^{nd}$ row and the $2^{nd}$ column are started at the $4^{th}$ moment. Certainly, the light source partitions may be alternatively started in another sequence. This is not limited in this application.

Case 2: The light source includes P emitters, and m emitters are selected from the P emitters at preset intervals.

Herein, the "at preset intervals" may be at an interval of one emitter or at an interval of two emitters. In case of an emitter array, a quantity of emitters within an interval in a row direction may be the same as or different from a quantity of emitters within an interval in a column direction.

Based on the case 2, an implementation of emitting, by the light source, m first beams at each of the M moments may be as follows:

m emitters selected from the P emitters at preset intervals are configured to emit m first beams at each of the M moments, where m emitters used to emit m first beams at each of the M moments vary.

Figure 5B:
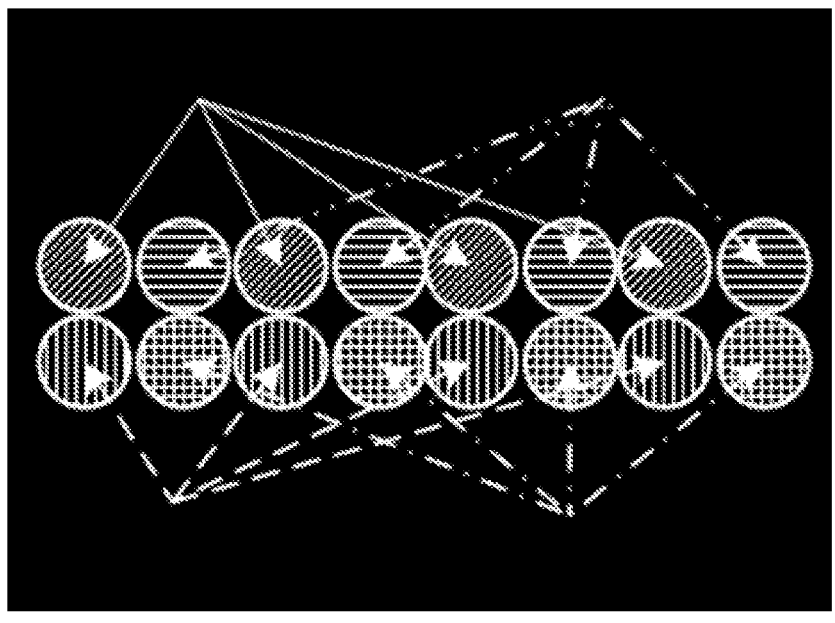
FIG. 5b is a schematic diagram of a structure of another light source according to this application.

In a possible implementation, the "at preset intervals" may be starting one emitter at an interval of one emitter. FIG. 5b is a schematic diagram of a structure of another light source according to this application. In FIG. 5b, for example, the light source includes 8×2 emitters, and a preset interval is an interval of one emitter in both a row direction and a column direction. The $1^{st}$, $3^{rd}$, $5^{th}$, and $7^{th}$ emitters in the $1^{st}$ row are started at the $1^{st}$ moment. The $2^{nd}$, $4^{th}$, $6^{th}$, and $8^{th}$ emitters in the $1^{st}$ row are started at the $2^{nd}$ moment. The $1^{st}$, $3^{rd}$, $5^{th}$, and $7^{th}$ emitters in the $2^{nd}$ row are started at the $3^{rd}$ moment. The $2^{nd}$, $4^{th}$, $6^{th}$, and $8^{th}$ emitters in the $2^{nd}$ row are started at the $4^{th}$ moment.

2. Beam Adjustment Assembly

In this application, S may be equal to m×n. Further, optionally, the beam adjustment assembly may be configured to adjust transmission directions of the received m first beams, split each of adjusted m first beams into n second beams to obtain m×n second beams, and project the m×n second beams to m×n regions of the detection surface, where the m×n regions are in a one-to-one correspondence with the m×n second beams, and n is an integer greater than 1.

In an optional implementation, the beam adjustment assembly adjusts an included angle between any two adjacent first beams of the m first beams into a first angle, and split each of the m first beams into n second beams. m emitters in one light source partition are started at each of the M moments, and M projection points that are in a same region of the detection surface and to which projection is performed at the M moments respectively have different locations, in other words, locations of projection points in a plurality of regions of the detection surface can be switched. The location switching of the projection points achieves an effect of scanning the detection surface (refer to FIG. 4). In other words, the beam adjustment assembly can control location arrangement of the projection points on the detection surface by adjusting the m first beams.

Based on the light source described in the case 1, in a possible implementation, the beam adjustment assembly may include a collimation assembly and a beam splitting assembly. The collimation assembly is configured to adjust the included angle between any two adjacent first beams of the m first beams that come from the light source into the first angle, and transmit the adjusted m first beams to the beam splitting assembly. The beam splitting assembly is configured to split each of the adjusted m first beams into n second beams, to obtain m×n second beams. The first angle is determined based on a total field of view corresponding to the detection surface and a quantity m×n of second beams. In other words, a magnitude of the first angle is related to the total field of view and a quantity of beams obtained through splitting by the beam splitting assembly. For example, using one dimension as an example, if the total field of view corresponding to the detection surface is 64 degrees, when m×n=160, the first angle is equal to 64/160=0.4 degrees. For another example, using two dimensions as an example, if the total field of view corresponding to the detection surface is 64×48 degrees, when m×n=160×120, the first angle is equal to (64/160)×(48/120)=0.4×0.4 degrees, where m×n=160×120 indicates that there are 160 second beams in a horizontal direction and 120 second beams in a vertical direction. Certainly, the collimation assembly may alternatively adjust included angles between two adjacent first beams in different directions into different angles. This is not limited in this application. It should be understood that the total field of view corresponding to the detection surface is usually approximately equal to a total field of view corresponding to the detector. The total field of view corresponding to the detector=a field of view of each detection element in the detector×a total quantity of detection elements in the detector.

Figure 6A:
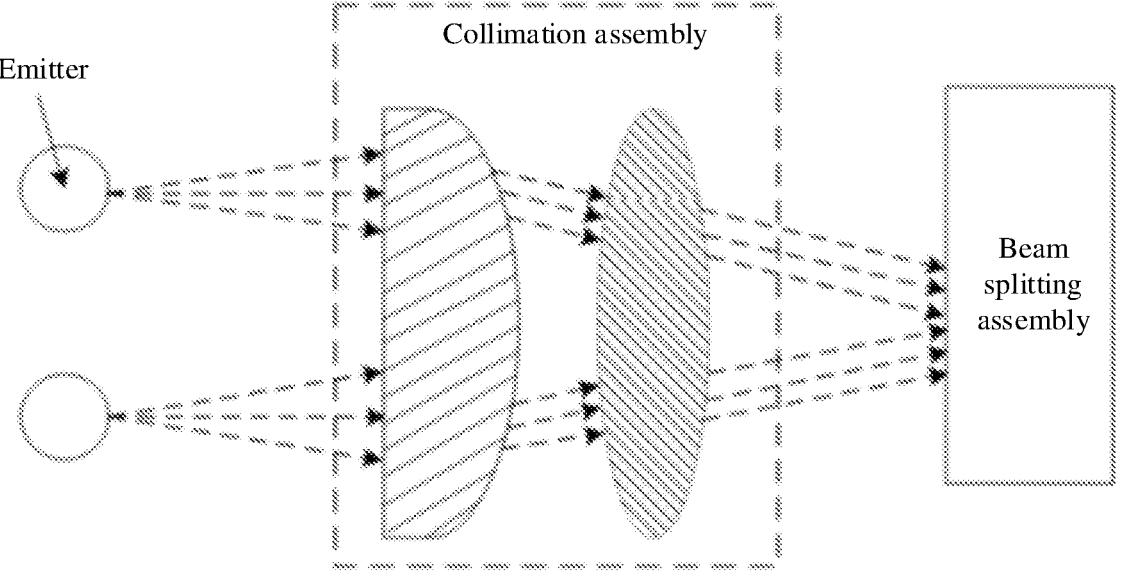
FIG. 6a is a schematic diagram of an optical path of a beam from a light source to a collimation assembly and then to an optical splitting assembly according to this application.

Further, optionally, the collimation assembly may collimate a divergent first beam emitted by each emitter into parallel light. In addition, because locations of emitters in the vertical direction are different, parallel light is aggregated, at different incident angles, to a plane on which the optical splitting assembly is located. Using the light source shown in FIG. 5a as an example, FIG. 6a is a schematic diagram of an example optical path of a beam from the light source to the collimation assembly and then to the optical splitting assembly. A first beam emitted by the light source has a specific full angle. In FIG. 6a, three lines represent one first beam. The first beam that comes from the light source is collimated by the collimation assembly into parallel light, and a collimated first beam is transmitted to the beam splitting assembly.

Figure 6B:
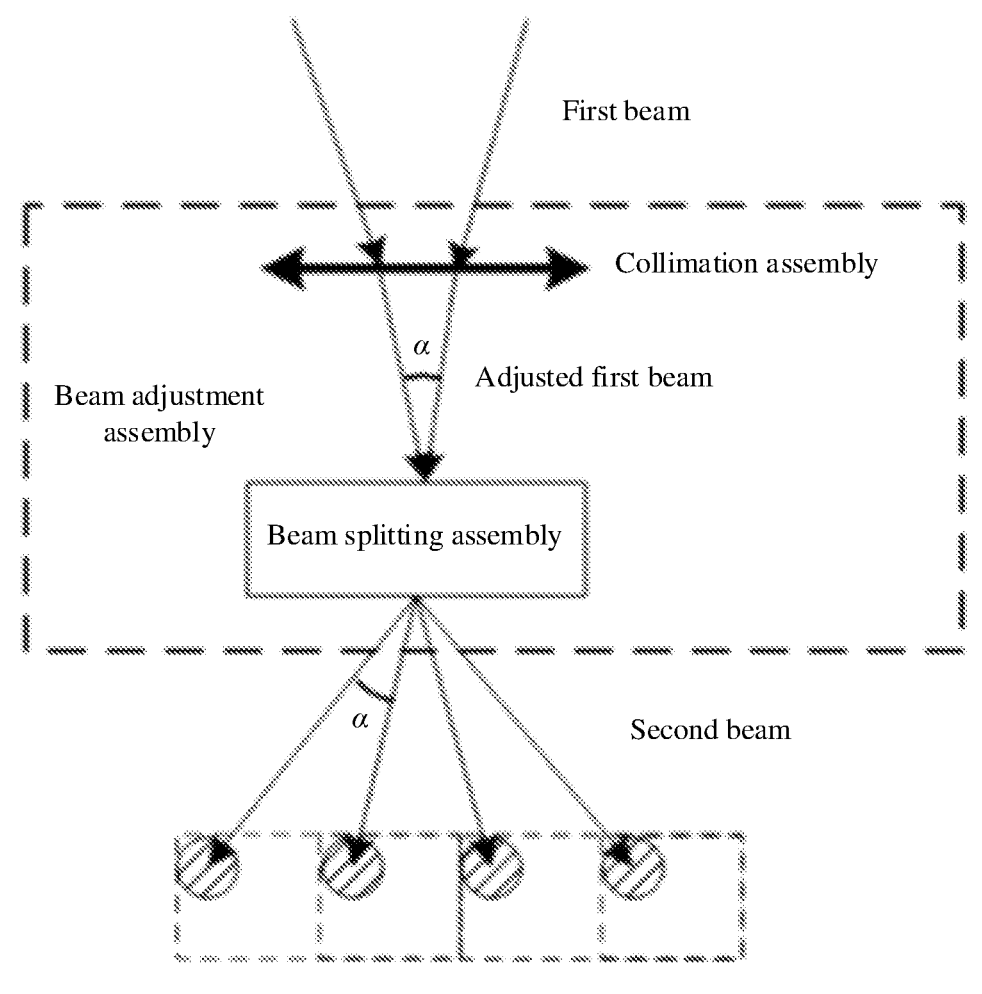
FIG. 6b is a schematic diagram of an optical path adjusted by a beam adjustment assembly according to this application.

FIG. 6b is a schematic diagram of an optical path adjusted by the beam adjustment assembly. An example in which two first beams are received from the light source at one moment and the beam splitting assembly splits each first beam into two second beams is used for description. The collimation assembly is configured to adjust an included angle between two adjacent first beams that come from the light source into the first angle α. Because the collimation assembly performs a same change on a transmission direction of each first beam, the beam splitting assembly also performs a same change on a transmission direction of each second beam. Therefore, after a first beam is split by the beam splitting assembly, an included angle between two adjacent second beams that are obtained is also a, and the included angle between two adjacent second beams may also be referred to as a separation angle. By adjusting the included angle between any two adjacent first beams of the m first beams that come from the light source into the first angle, the m×n second beams are uniformly projected to same locations in the m×n regions of the detection surface. With reference to FIG. 6b, 2×2 second beams at the moment are uniformly projected to upper left corners of all of 2×2 regions of the detection surface. At a next moment of the moment, 2×2 second beams may be uniformly projected to locations adjacent to the upper left corners in all of the 2×2 regions of the detection surface.

Based on the light source described in the case 2, in a possible implementation, the beam adjustment assembly may include a collimation assembly and a beam splitting assembly. The collimation assembly is configured to adjust the included angle between any two adjacent first beams of the m first beams into a second angle, and transmit the adjusted m first beams to the beam splitting assembly, where the second angle is determined based on a total field of view corresponding to the detection surface and a quantity m of started light sources. For example, if the total field of view corresponding to the detection surface is 64×48 degrees, when m=16×12, the second angle is equal to (64/16)×(48/12)=4×4 degrees. The beam splitting assembly is configured to split each of the adjusted m first beams into n second beams. It can be understood that, to form an image with a resolution of 320×240 when the total field of view corresponding to the detection surface is 64×48 degrees, an angle between beams corresponding to two adjacent projection points on the detection surface is 64/320=0.2 degrees. 0-order diffracted light of the m first beams is uniformly projected to 320×240 regions. To be specific, an interval between projection points of 0-order diffracted light of any two adjacent first beams of the m first beams is 19 projection points, and the included angle between any two adjacent first beams=the second angle=[(64/320)×(320/16)]×[(64/320)×(240/12)]=[0.2×20]×[0.2×20]=4×4 degrees. It should be understood that the interval of 19 projection points means that an interval between two projection points, on the detection surface, of 0-order diffracted light of two adjacent first beams is 19 projection points. In other words, a pitch between centers of the projection points corresponding to the two beams of 0-order diffracted light is 20 projection points (refer to FIG. 10).

In a possible implementation, the collimation assembly may be a collimator, or a collimation mirror, a microlens, or a combination of microlenses. Further, optionally, a focal length of the collimator, the collimation mirror, the microlens, or the combination of microlenses may be adjusted, to adjust an included angle between two adjacent first beams that come from the light source. The beam splitting assembly may be a DOE, a polarizing beam splitter (PBS), or a grating.

In this application, the focal length f of the collimator, the collimation mirror, the microlens, or the combination of microlenses may be adjusted or selected, to adjust the included angle between any two adjacent first beams of the m first beams that come from the light source into the first angle. For ease of description of the solution, the collimator is used as an example below. An included angle between two adjacent first beams is related to the focal length f of the collimator and a pitch of an emitter in the light source. This may be specifically as follows: f=pitch/tan($\alpha$), where a is the included angle between two adjacent first beams. For example, if a size of a pitch between EEL-based emitters is 30 μm and the included angle between any two adjacent first beams of the m first beams is as follows: $\alpha$=0.4 degrees, f=pitch/tan($\theta$)=30/tan(0.4)=4.3 mm. This may also be understood as that, by adjusting/selecting the focal length of the collimator to/as 4.3 mm, the included angle between any two adjacent first beams of the m first beams that come from the light source may be adjusted to 0.4 degrees.

Figure 6C:
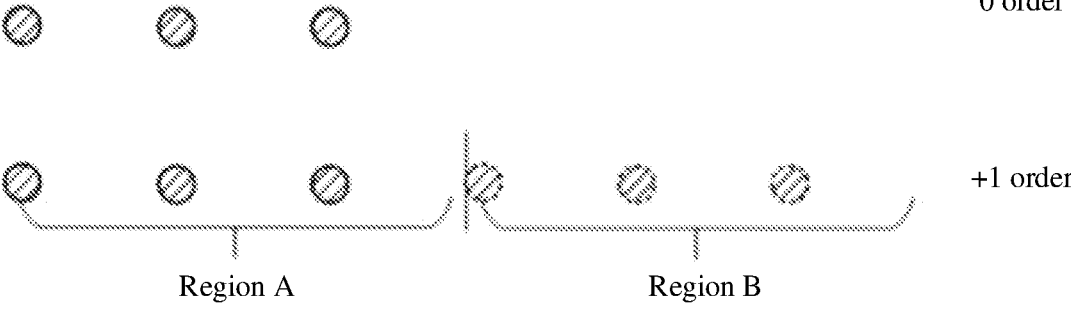
FIG. 6c is a schematic diagram of arrangement of projection points on a detection surface according to this application.

In a possible implementation, if the beam splitting assembly is a DOE, a second beam is diffracted light of a first beam. A projection point, on the detection surface, of 0-order diffracted light of a first beam is a direct projection point of the first beam. Projection points of ±1-order diffracted light, ±2-order diffracted light, ±3-order diffracted light, and the like on the detection surface are equivalent to projection points obtained by separately copying the projection point of the 0-order diffracted light to corresponding regions. With reference to FIG. 6c, +1-order diffracted light in a region B is equivalent to diffracted light obtained by copying 0-order diffracted light in a region A to the region B.

3. Detection Assembly

Figure 6D:
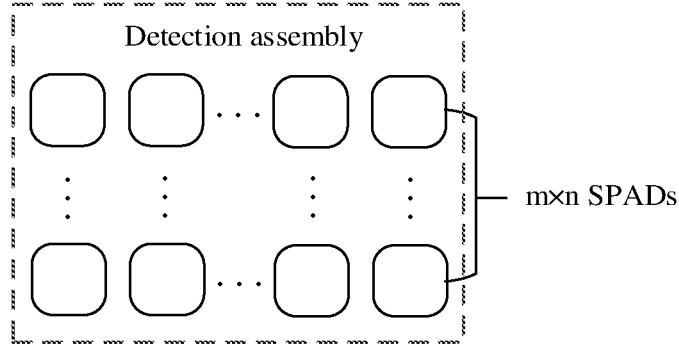
FIG. 6d is a schematic diagram of a structure of a detection assembly according to this application.
Figure 6E:
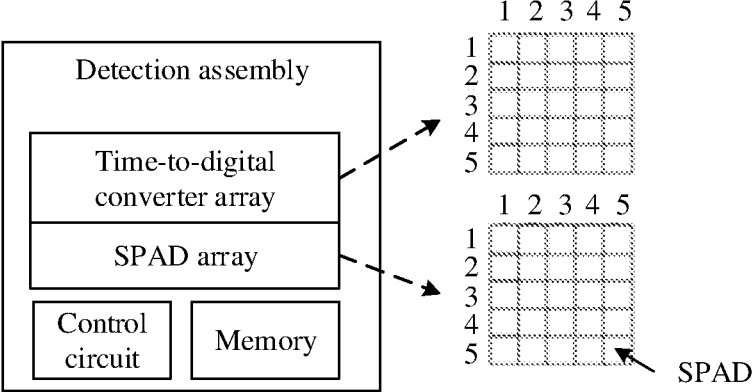
FIG. 6e is a schematic diagram of a structure of another detection assembly according to this application.

FIG. 6e is a schematic diagram of a structure of another detection assembly according to this application. The detection assembly may include an SPAD array and a TDC array. Further, optionally, the detection assembly may further include a memory and a control circuit. For example, the TDC array is a 5×5 TDC array, and the SPAD array is also a 5×5 array. The 5×5 SPAD array corresponds to the 5×5 TDC array. It is assumed that a TDC starts timing when detecting a first pulse signal. The TDC stops timing when one of at least one SPAD corresponding to the TDC obtains an optical echo signal reflected from the detection surface. In this case, a time of flight detected by the TDC can be obtained. Each TDC/SPAD corresponds to a storage unit in a memory. The control circuit stores, to the memory, a time of flight detected by the SPAD/TDC.

In this application, the detection assembly may include K detection elements, and may power on S detection elements of the K detection elements at each of the M moments (refer to FIG. 1b), where K is an integer greater than or equal to S.

In a possible implementation, the detection assembly may include m×n detection elements, and the detection element usually includes an SPAD and a TDC. With reference to FIG. 6d, herein, an SPAD is used to simply illustrate a detection element, and the m×n detection elements are in a one-to-one correspondence with m×n regions. In other words, one detection element corresponds to one region of the detection surface. Each of the m×n detection elements is configured to receive an optical echo signal from a corresponding region at each of the M moments, and convert the optical echo signal from the corresponding region into an electrical echo signal for storage at each moment. Using one detection element as an example, the detection element may receive one optical echo signal from the corresponding region at the 1$^{st}$ moment, may also receive one optical echo signal from the corresponding region at the 2$^{nd}$ moment, and so on, and may also receive one optical echo signal from the corresponding region at the M$^{th}$ moment, so that a total of M optical echo signals are obtained at the M moments. In other words, one detection element may store M optical echo signals. It should be noted that, if the detection assembly includes m×n detection elements, all the m×n detection elements are powered on when emitters in one light source partition are selected at each of the M moments; or if a quantity of detection elements included in the detection assembly is greater than m×n, only m×n detection elements of the detection elements may be powered on when emitters in one light source partition are selected at each of the M moments. For example, the detection assembly includes 320×240 detection elements, and only 160×120 detection elements of the detection elements may be powered on at each moment. In this way, power consumption can be reduced because not all detection elements need to be powered on.

In this application, the detection assembly includes a detector, and the detector may include a detection element array, for example, an SPAD array, a PIN-type photodiode (also referred to as a PIN junction diode) array, or an avalanche photodiode (APD) array.

In this application, the TOF sensor module may further include a processing circuit, and the processing circuit is configured to obtain, from the detection assembly, M×S electrical echo signals obtained at the M moments, and determine image information based on the M×S electrical echo signals. In this way, the processing circuit determines the image information based on M×S electrical echo signals, thereby helping increase a resolution of a formed image.

Further, optionally, the processing circuit may be integrated in the detection assembly, or may be a processor in an electronic device or a laser radar in which the TOF sensor module is located, for example, a central processing unit (CPU) in a mobile phone. If the processing circuit is integrated in the detection assembly, the detection assembly may send a stored electrical echo signal to the processing circuit, and the processing circuit may determine image information based on the received electrical echo signal. If the processing circuit is the processor in the electronic device or the laser radar in which the TOF sensor module is located, the detection assembly may send a stored electrical echo signal to the processor, and the processor may determine image information based on the received electrical echo signal.

In this application, the TOF sensor module may further include a receiving assembly. The receiving assembly is configured to receive an optical echo signal from the detection surface, and transmit the optical echo signal to the detection assembly. In a possible implementation, the receiving assembly may be a lens group.

Further, optionally, the TOF sensor module may further include a light filter, and the light filter may be located before the receiving assembly, or may be located between the receiving assembly and the detection assembly, to reduce impact of ambient light on the detection assembly.

Based on the foregoing content, the following provides two specific examples of the TOF sensor module with reference to a specific hardware structure, to help further understand the structure of the TOF sensor module.

In the following two examples, for ease of description of the solution, for example, the beam adjustment assembly includes a collimator and a DOE, the total field of view corresponding to the detection surface is 64×48 degrees, and 160×120 detection elements can be simultaneously started at most in the detection assembly.

Example 1

When 160×120 detection elements can be simultaneously started at most in the detection assembly, to implement VGA for a formed image (that is, a resolution of the image is 640×480), in a possible case, the light source includes 4×4=16 light source partitions, and each light source partition includes 10×10 emitters. 10×10 first beams emitted by 10×10 emitters in each light source partition pass through the collimator and then are projected to the DOE. A quantity of effective beams obtained through splitting by the DOE is 16×12 (16 and 12 are quantities of effective beams obtained through splitting by the DOE in a horizontal direction and a vertical direction respectively). A quantity of second beams that come from one light source partition is as follows: m×n=(16×10)×(12×10)=160×120. To be specific, when m emitters of a single light source partition are started, 160×120 second beams may be generated. The 160×120 second beams are projected to 160×120 regions of the detection surface. (4×160)×(4×120)=640×480 second beams may be generated for the 4×4 light source partitions, and 4×4 second beams may be projected to each light source partition of the detection surface, so that a resolution of a formed image may be 640×480.

It should be noted that any one or more of a quantity of light source partitions in the light source, a quantity of emitters included in a light source partition, and a quantity of effective beams obtained through splitting by the DOE may be further changed, so that a resolution of an image formed by the TOF sensor module can meet VGA. It should be understood that a resolution of 640×480 or higher can be achieved by increasing the quantity of light source partitions in the light source and/or the quantity of emitters in the light source partition and/or the quantity of effective beams obtained through splitting by the DOE.

Figure 7:
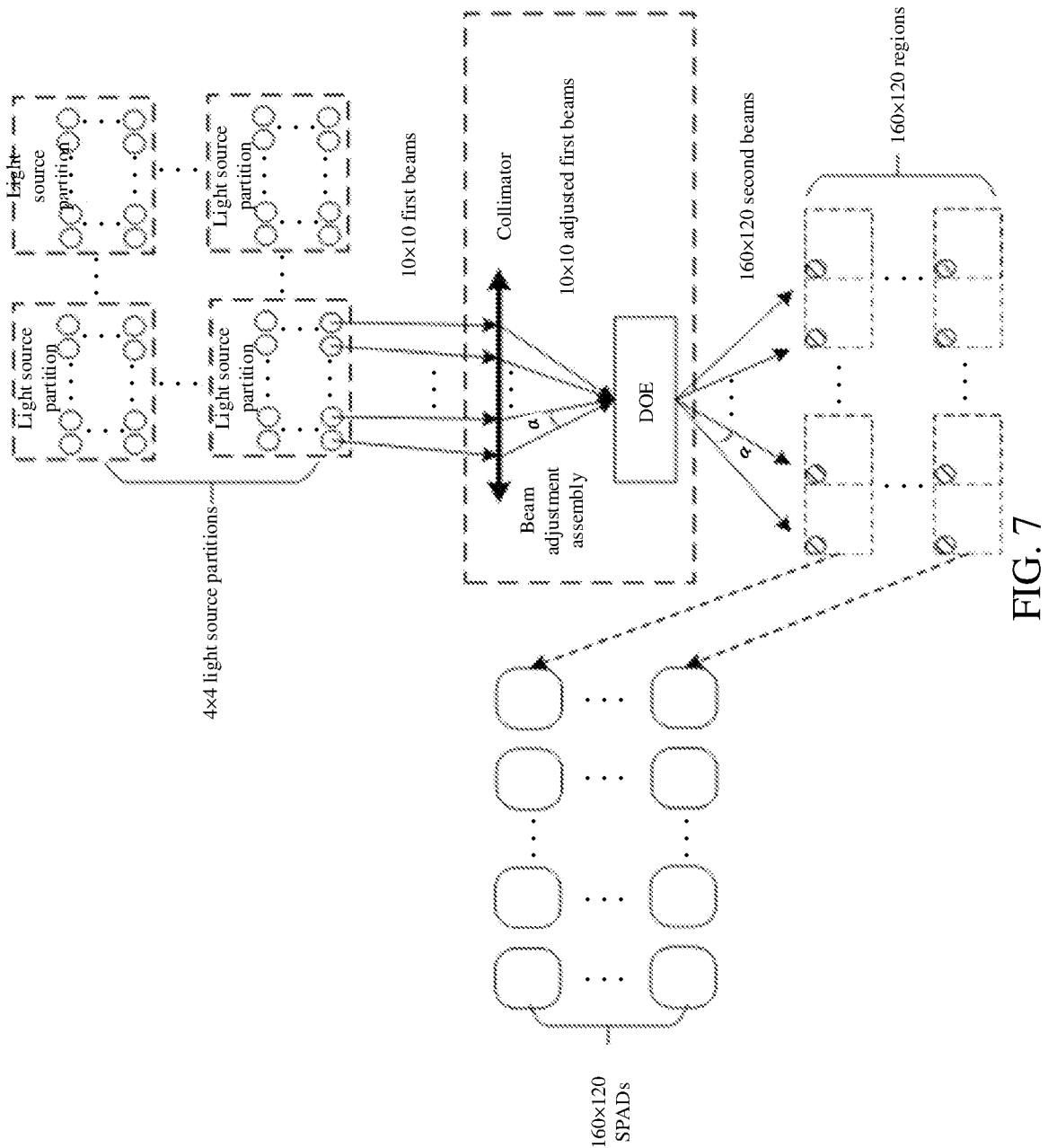
FIG. 7 is a schematic diagram of a structure of another TOF sensor module according to this application.

FIG. 7 is a schematic diagram of a structure of another TOF sensor module according to this application. The TOF sensor module may include a light source, a beam adjustment assembly, and a detection assembly. The beam adjustment assembly includes a collimator and a DOE. The light source includes 4×4=16 light source partitions. Each light source partition includes 10×10 emitters. 10×10 emitters in one of the 4×4 light source partitions emit 10×10 first beams at each moment, where a light source partition used to emit 10×10 first beams at each of 16 moments varies. This may also be understood as that 10×10 emitters in the $1^{st}$ light source partition respectively emit 10×10 first beams at the $1^{st}$ moment, 10×10 emitters in the $2^{nd}$ light source partition respectively emit 10×10 first beams at the $2^{nd}$ moment, and so on.

The collimator is configured to adjust transmission directions of the received 10×10 first beams, to adjust an included angle between any two adjacent first beams of the 10×10 first beams in each direction into a first angle. The first angle is determined based on a total field of view and a quantity m×n of second beams. Specifically, the first angle=(64/

160)×(48/120)=0.4×0.4. To be specific, an included angle between any two adjacent first beams of 10×10 first beams adjusted by the collimator in each of a horizontal direction and a vertical direction is 0.4 degrees. Because an included angle between two adjacent first beams after adjustment is 0.4 degrees, 10 emitters with different heights in one light source partition can cover a field of view of 10×0.4=4 degrees, and four light source partitions can cover a field of view of 4×4=16 degrees.

To adjust an included angle between two adjacent first beams to the first angle, a focal length of the collimator is as follows: f=pitch/tan(α)=pitch/tan(0.4). When the emitter is an EEL-based emitter (emitter), f=30/tan(0.4)=4.3 mm.

Further, the collimator transmits the adjusted 10×10 first beams to the DOE. The DOE is configured to split each of the adjusted 10×10 first beams into 16×12 second beams, to obtain 160×120 second beams, and project the 160×120 second beams to same locations in 160×120 regions of a detection surface. A total of 4×4 light source partitions are started at 16 moments, and four scans can be implemented in each of the 160×120 regions of the detection surface. To be specific, each light source partition is projected to 160×120 projection points on the detection surface, and 4×4 light source partitions are projected to (160×4)×(120×4) projection points on the detection surface. To form a VGA image when a total field of view corresponding to the detection surface is 64×48 degrees, an angle between beams corresponding to two adjacent projection points on the detection surface is 64/640=0.1 degrees, in other words, an included angle between two adjacent second beams corresponding to two adjacent projection points on the detection surface is 0.1 degrees. With reference to FIG. 4, a projection point corresponding to the $1^{st}$ moment and a projection point corresponding to the $2^{nd}$ moment are two adjacent projection points, a pitch between centers of the two adjacent projection points is one projection point, and an included angle between two second beams corresponding to the two adjacent projection points is 0.1 degrees; an included angle between two second beams corresponding to an interval of one projection point is 0.2 degrees; and an included angle between two second beams corresponding to an interval of two projection points is 0.3 degrees.

With reference to FIG. 4, one light source partition is started at one moment. For example, four light source partitions are respectively started at four moments. Each of 160×120 second beams that come from the $1^{st}$ light source partition is projected to an upper left corner (that is, a projection point corresponding to the $1^{st}$ moment) in each of 160×120 regions of the detection surface, each of 160×120 second beams that come from the $2^{nd}$ light source partition are projected to a location (a projection point corresponding to the $2^{nd}$ moment) adjacent to the upper left corner in each of the 160×120 regions of the detection surface, and so on, so that an effect of scanning the detection surface can be achieved. In other words, projection points, on the detection surface, of two adjacent second beams that come from two adjacent light source partitions are adjacent and do not overlap.

Figure 8:
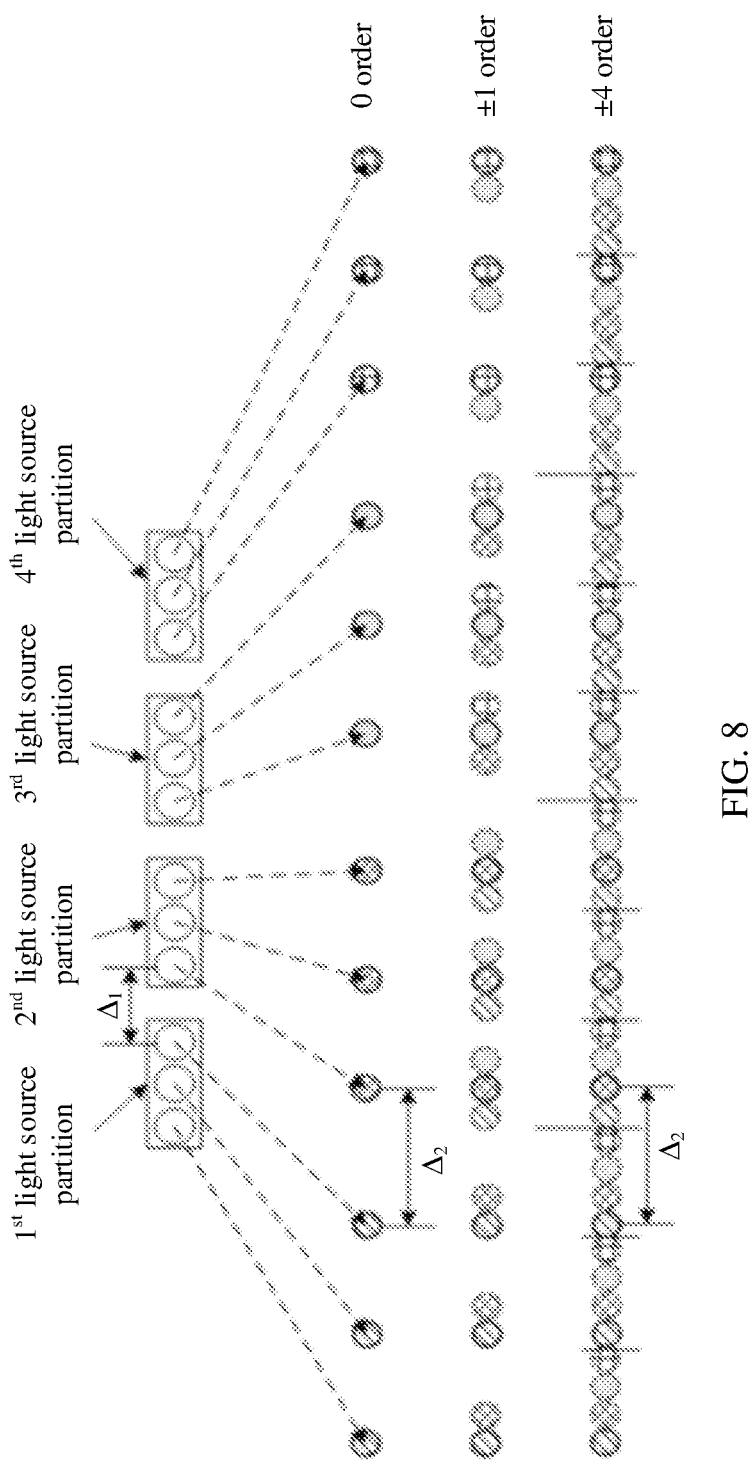
FIG. 8 is a schematic diagram of a relationship between a light source and a projection point on a detection surface according to this application.

In this application, a pitch $\Delta_1$ between two adjacent emitters of two adjacent light source partitions (refer to FIG. 5a or FIG. 8) may be set, so that projection points, on the detection surface, of two adjacent second beams that come from two adjacent light source partitions are adjacent and do not overlap. FIG. 8 is a schematic diagram of a relationship between a light source and a projection point on a detection surface according to this application. For ease of description of the solution, an example in which the light source in FIG.

8 includes four light source partitions and each light source partition includes three emitters is used for description. An included angle between first beams emitted by two adjacent emitters of two adjacent light source partitions of the light source is greater than or equal to an angle corresponding to an interval of four projection points on the detection surface. Each region of the detection surface includes four projection points. An interval between direct projection points of two adjacent emitters that come from a same light source partition is three projection points (an included angle between two corresponding second beams is 0.4 degrees). An interval between direct projection points of first beams emitted by two adjacent emitters that come from two adjacent light source partitions is four projection points (an included angle between two corresponding second beams is 0.5 degrees, and a pitch between centers of projection points of the two second beams is as follows: $\Delta_2$=five projection points). In FIG. 8, a same filling indicates projection points of second beams that come from a same light source partition. A ±4-order projection point on the detection surface in FIG. 8 may be understood as that 0-order diffracted light is copied once in each of three regions other than a region in which the 0-order diffracted light is located, thereby implementing four scans, that is, achieving a super-resolution effect.

It should be noted that, ±1-order diffracted light that comes from the $(i+1)^{th}$ light source partition is located on the left or right of 0-order diffracted light that comes from the $i^{th}$ light source partition. For example, −1-order diffracted light that comes from the $2^{nd}$ light source partition is located on the left of 0-order diffracted light that comes from the $1^{st}$ light source partition. For another example, −1-order diffracted light that comes from the $3^{rd}$ light source partition is located on the right of 0-order diffracted light that comes from the $2^{nd}$ light source partition. ±2-order diffracted light that come from the $(i+1)^{th}$ light source partition is located on the left or right of ±1-order diffracted light that comes from the $i^{th}$ light source partition, and so on, so that projection points on the detection surface can be closely connected, to form a schematic diagram of arrangement of projection points in FIG. 8. In addition, more orders of beam splitting may be required for a first beam that comes from an edge light source partition of the light source. With reference to FIG. 8, a leftmost projection point is 0-order diffracted light of a first beam that comes from the $1^{st}$ light source partition. In the $3^{rd}$ row, −1-order diffracted light, −2-order diffracted light, and −3-order diffracted light that come from the $1^{st}$ light source partition are on the left of the 0-order diffracted light, and are not projected to the detection surface. In other words, +1-order diffracted light, +2-order diffracted light, and +3-order diffracted light of the first beam that comes from the $1^{st}$ light source partition are effective beams. Therefore, it may be determined that the DOE splits each first beam into m×n second beams, and the m×n second beams are effective beams. During actual beam splitting, the DOE may obtain more than m×n beams through splitting. For example, that the DOE splits each first beam into 16×12 second beams means that a quantity of effective second beams into which the DOE splits each first beam is 16×12. It should be understood that, if waste of diffraction orders is not considered, beam splitting orders of the DOE are ±8 orders×(±6) orders; or if waste of diffraction orders is considered, beam splitting orders of the DOE are usually ±12 orders×(±10) orders.

The detection assembly may include 160×120 detection elements, and one detection element corresponds to one region. In FIG. 7, for example, two regions correspond to two SPADs. When 10×10 emitters of one light source partition are started, all the 160×120 detection elements included in the detection assembly may be selected, and each detection element may be configured to receive an optical echo signal from a corresponding region, and convert the optical echo signal from the corresponding region into an electrical echo signal for storage at each moment. At 4×4 moments, each detection element may receive 4×4 optical echo signals from a corresponding region, to obtain an image with a resolution of (4×160)×(4×120)=640×480.

Based on the example 1, non-scanning three-dimensional detection with a VGA resolution or a higher resolution can be implemented based on a capability of a conventional detector. By starting light source partitions of the light source through switching, second beams can be projected to different regions of the detection surface, thereby implementing resolution superposition, and achieving a TOF with the VGA resolution or a million-level resolution.

Example 2

When 160×120 detection elements can be simultaneously started at most in the detection assembly, to form an image with a resolution of 320×240, in a possible case, the light source includes 32×24 emitters, and a preset interval is starting one emitter at an interval of one emitter (refer to FIG. 5$b$). In the example 2, 16×12 emitters may be started at each moment, and a quantity of effective beams obtained through splitting by the DOE is in an order of 10×10. To be specific, the DOE may split 1×1$^{st}$ first beam into 10×10 second beams. At one moment, a quantity of second beams projected to the detection surface is as follows: m×n=(16× 10)×(12×10)=160×120. To be specific, 16×12 emitters are started at each of two moments, so that a formed image has a resolution of 320×240. It should be noted that one or more of a preset interval of emitters started each time, a quantity of emitters started each time, and a quantity of effective beams obtained through splitting by the DOE may be designed to implement the resolution of 320×240. This is not limited in this application. It should be understood that, by changing the preset interval of emitters started each time and/or the quantity of emitters started each time and/or the quantity of effective beams obtained through splitting by the DOE, a resolution of a formed image can reach 640×480 or higher.

Figure 9:
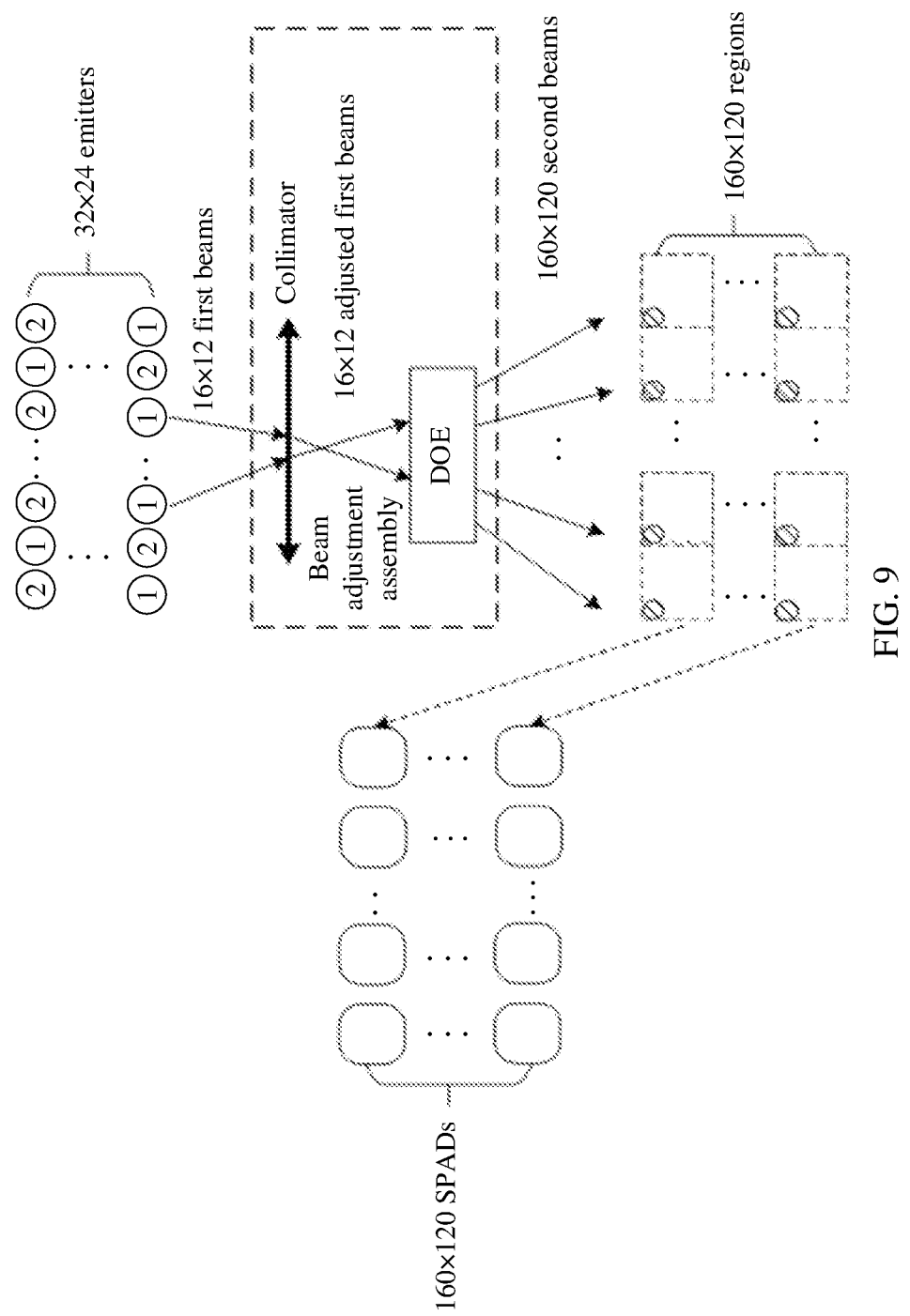
FIG. 9 is a schematic diagram of another relationship between a light source and a projection point according to this application.

FIG. 9 is a schematic diagram of a structure of still another TOF sensor module according to this application. The TOF sensor module may include a light source, a beam adjustment assembly, and a detection assembly. The beam adjustment assembly may include a collimator and a DOE. The light source includes 32×24 emitters. 16×12 emitters of the 32×24 emitters emit 16×12 first beams at preset intervals (an interval is one emitter) at each of two moments, where 16×12 emitters used to emit 16×12 first beams at each of the two moments vary. This may also be understood as that one emitter is started at an interval of one emitter (refer to the descriptions of the case 2), 16×12 emitters of the 32×24 emitters are started, and the started 16×12 emitters emit 16×12 first beams.

Figure 10:
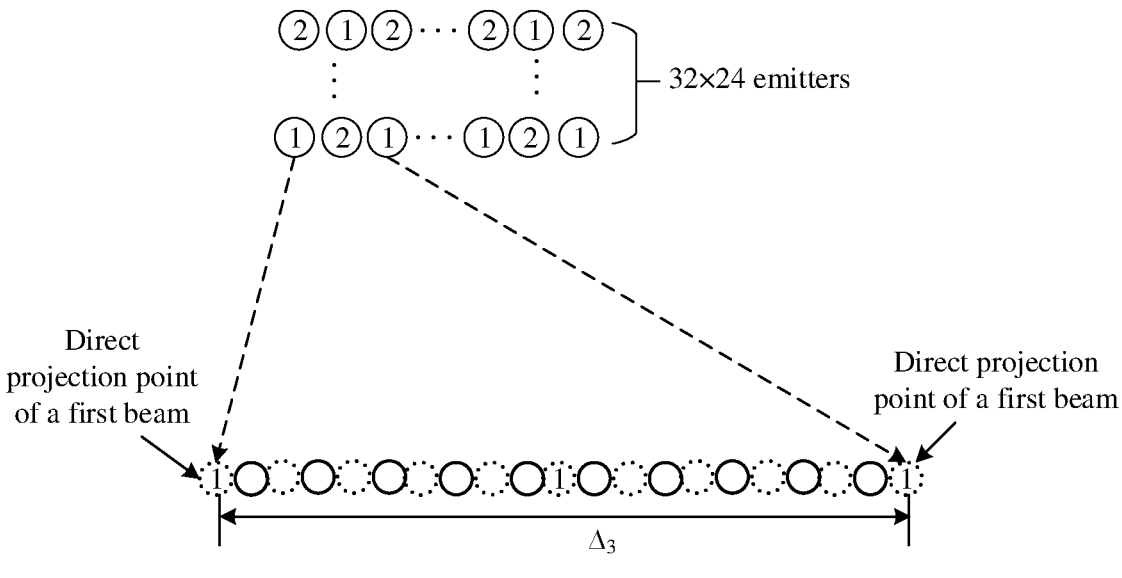
FIG. 10 is a schematic diagram of another relationship between a light source and a projection point on a detection surface according to this application.

The collimator is configured to adjust transmission directions of the received 16×12 first beams, to adjust an included angle between any two adjacent first beams of the 16×12 first beams in each direction into a second angle. The second angle is determined based on a total field of view corresponding to a detection surface and a quantity m of started emitters. Specifically, the second angle=(64/16)×(48/12)=4× 4. To be specific, an included angle between any two adjacent first beams of 16×12 first beams obtained after adjustment by the collimator in each of two directions is 4 degrees. It can be understood that the collimator transmits the adjusted first beams to the DOE, and in this case, an included angle between two adjacent second beams from a same moment in each of a horizontal direction and a vertical direction is 4 degrees. An angle corresponding to two adjacent projection points is $(64/320) \times (48/240) = 0.2 \times 0.2$. Therefore, an interval between direct projection points of first beams that come from two adjacent emitters at a same moment is 19 projection points (in other words, a pitch between the direct projection points of the two first beams is 20 projection points). Refer to FIG. 10.

In the example 2, to implement uniform arrangement of projection points on the detection surface, a focal length of the collimator may be adjusted to achieve an interval $\Delta_3$ between direct projection points of first beams of two adjacent emitters (for example, two adjacent emitters 1 in FIG. 10) of m started emitters. An included angle between the two first beams at an interval of 19 projection points is as follows: $\alpha = (64/320) \times 20 = 4$ degrees. Therefore, the focal length of the collimator may be selected or adjusted as follows: $f = pitch/tan(\alpha) = pitch/tan(4)$.

Further, the collimator transmits the adjusted $16 \times 12$ first beams to the DOE. The DOE is configured to split each of the adjusted $16 \times 12$ first beams into $10 \times 10$ second beams, to obtain $160 \times 120$ second beams, and project the $160 \times 120$ second beams to same locations in $160 \times 120$ regions of the detection surface, for example, the upper left corner of each region of the detection surface in FIG. 9. For detailed descriptions, refer to FIG. 4. Details are not described herein again.

The detection assembly may include $160 \times 120$ detection elements. Each detection element may receive two optical echo signals from a corresponding region of the detection surface, to obtain an image with a resolution of $(2 \times 160) \times (2 \times 120) = 320 \times 240$.

Based on the example 2, m emitters are started at each of M moments at preset intervals (for example, at equal intervals), and a resolution of a formed image can reach $320 \times 240$ or higher without a special design for emitter arrangement.

Figure 11A:
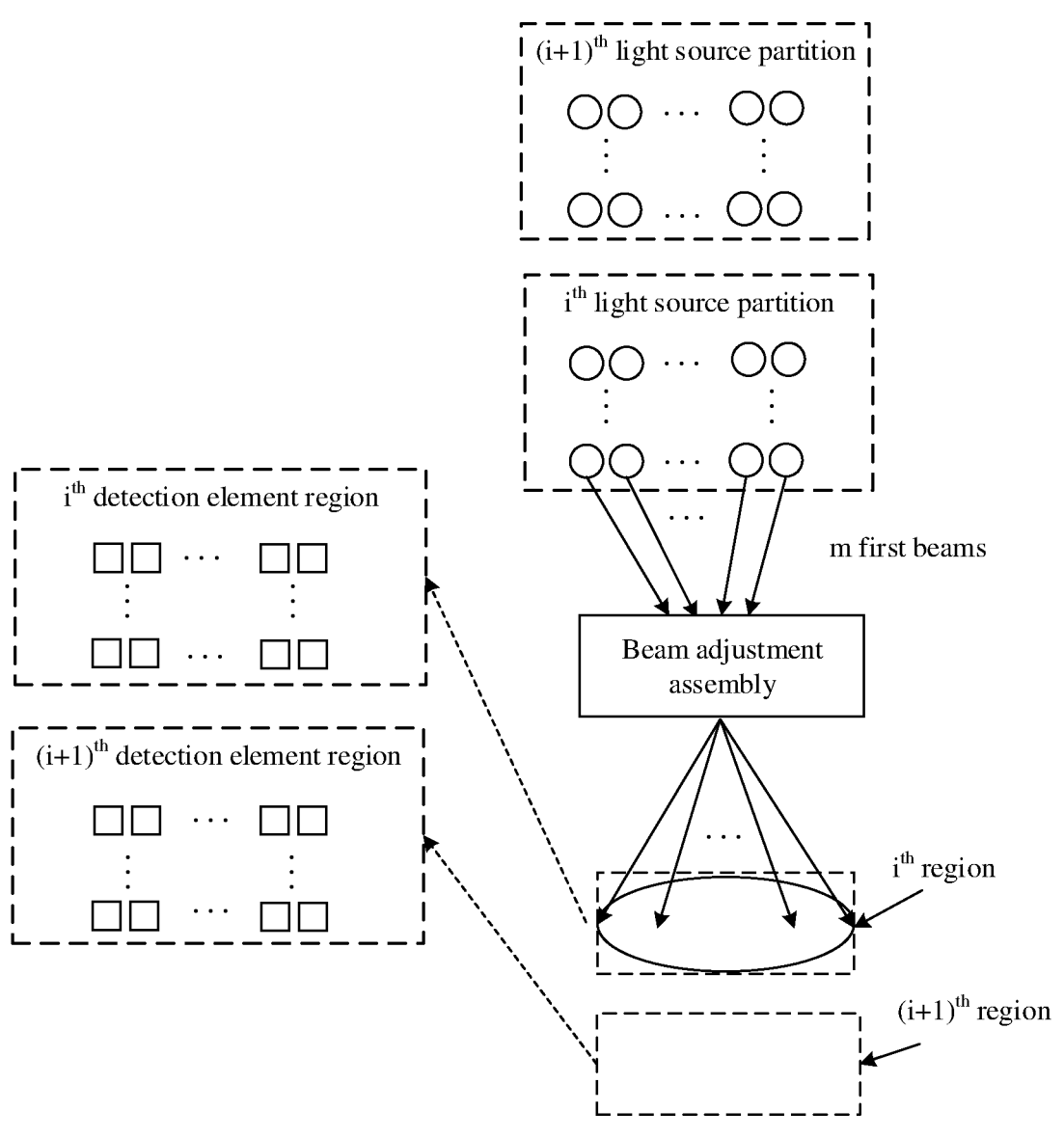
FIG. 11a is a schematic diagram of a structure of still another TOF sensor module according to this application.

FIG. 11*a* is a schematic diagram of a structure of still another TOF sensor module according to this application. The TOF sensor module may include a light source, a beam adjustment assembly, and a detection assembly. The light source is configured to emit m first beams at each of M moments, and transmit the m first beams to the beam adjustment assembly, where both m and M are integers greater than 1.

In a possible implementation, m emitters in one of the M light source partitions emit m first beams at each moment, where a light source partition used to emit m first beams at each of the M moments varies. In FIG. 11*a*, for example, the light source includes M light source partitions, and each light source partition includes m emitters. For example, FIG. 11*a* shows the $i^{th}$ light source partition and the $(i+1)^{th}$ light source partition. m emitters included in the $i^{th}$ light source partition emit m first beams. For details, refer to the descriptions of the case $1^{st}$ of the light source in FIG. 3, and details are not described herein again.

Figure 5C:
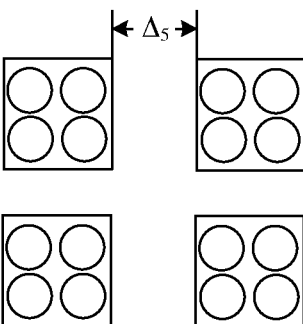
FIG. 5c is a schematic diagram of a composite structure of a light source array according to this application.

Further, optionally, the M light source partitions included in the light source are integrally molded. In this way, it can be ensured that the M light source partitions are on a same plane. The light source provided with reference to FIG. 5*a* includes four light source partitions, to be specific, $4 \times 4$ emitters are divided into $2 \times 2$ light source partitions, and the $4 \times 4$ emitters are integrally molded. Compared with a spliced light source array, the M integrally molded light source partitions do not require additional assembly to control surface flatness. FIG. 5*c* is a schematic diagram of a combination of $2 \times 2$ light source arrays. In the light source arrays shown in FIG. 5*c*, the $2 \times 2$ light source arrays need to be assembled, and it needs to be ensured that the $2 \times 2$ light source arrays are on a same plane. Therefore, assembly is relatively difficult.

With reference to FIG. 5*a* and FIG. 5*c*, an interval $\Delta_4$ between light source partitions in FIG. 5*a* can be controlled to be approximately 40 μm, and an interval $\Delta_5$ between light source arrays in FIG. 5*c* needs to be at least 100 micrometers because assembly is required. In other words, the light source partitions in this application facilitate miniaturization of the TOF sensor module. Further, a size of the M light source partitions is relatively small, so that a drive of the light source may be integrated at the bottom of or next to the light source. This facilitates miniaturization of the TOF sensor module.

The beam adjustment assembly is configured to: after adjusting transmission directions of the received m first beams, project adjusted m first beams to a corresponding region of a detection surface. A projection point that is on the detection surface and to which projection is performed at each of the M moments is located in a separate region. This may also be understood as that second beams that come from one light source partition are all projected to a corresponding region of the detection surface. In FIG. 11*a*, m first beams that come from the $i^{th}$ light source partition are adjusted by the beam adjustment assembly and then projected to the $i^{th}$ region.

In a possible implementation, the beam adjustment assembly is configured to adjust the transmission directions of the m first beams, and uniformly project the m first beams to the corresponding region. The following provides four implementations of uniformly projecting the m first beams to the $i^{th}$ region as examples.

Implementation 1: The beam adjustment assembly includes a collimator.

The collimator is configured to adjust an included angle between any two adjacent first beams of the m first beams into a third angle. The third angle is determined based on a field of view corresponding to the $i^{th}$ region and the quantity m of first beams. The field of view corresponding to the $i^{th}$ region=a total field of view of the detection surface/M. The third angle=the total field of view of the detection surface/M/m.

Implementation 2: The beam adjustment assembly includes a beam tuner (DOE tuner), also referred to as a beam scaler.

The beam scaler is configured to expand each of the m first beams that come from the $i^{th}$ light source partition of the light source, to expand the m first beams into one uniform beam, and project the uniform beam to the $i^{th}$ region.

Implementation 3: The beam adjustment assembly includes a collimator and a DOE.

The collimator is configured to adjust an included angle between any two adjacent first beams of the m first beams that come from the $i^{th}$ light source partition of the light source into a third angle. The DOE is configured to split each adjusted first beam into n second beams. The third angle is determined based on a field of view corresponding to the $i^{th}$ region and a quantity $m \times n$ of second beams. The field of view corresponding to the $i^{th}$ region=a total field of view of the detection surface/M. The third angle=the total field of view of the detection surface/M/($m \times n$).

This may also be understood as that the collimator is configured to transmit, to the DOE or a diffuser at a specific full angle or in parallel at a specific angle, the m first beams that come from the $i^{th}$ light source partition of the light source. The DOE or the diffuser properly diffuses or shapes the received first beams, and transmit the first beams to the $i^{th}$ region of the detection surface. A beam transmitted to the $i^{th}$ region may be in a circular or square shape, or is a dense lattice. This is not limited in this application.

Implementation 4: The beam adjustment assembly includes a collimator and a beam tuner.

The collimator is configured to transmit, to the beam tuner in parallel at a third angle, the m first beams that come from the $i^{th}$ light source partition of the light source. The beam tuner diffuses collimated light, and transmits diffused collimated light to the $i^{th}$ region of the detection surface.

It should be noted that the collimator is closer to the light source and farther away from the detection surface than the DOE; or the collimator is farther away from the light source and closer to the detection surface than the DOE.

The detection assembly is configured to: receive m optical echo signals from a corresponding region of the detection surface at each of the M moments, to be specific, the detection assembly receives m optical echo signals from the $1^{st}$ region at the $1^{st}$ moment, receives m optical echo signals from the $2^{nd}$ region at the $2^{nd}$ moment, and so on, receives m optical echo signals from the $M^{th}$ region at the $M^{th}$ moment; and converts the m optical echo signals into m electrical echo signals for storage at each moment, where the m optical echo signals are in a one-to-one correspondence with the m first beams, and an optical echo signal is a signal obtained by reflecting a corresponding first beam by the detection surface.

In a possible implementation, the detection assembly may include M detection element regions, and the M detection element regions of the detection assembly are in a one-to-one correspondence with the M light source partitions. Each detection element region includes a plurality of detection elements, and each detection element region is configured to receive optical echo signals obtained by reflecting, by the detection surface, beams emitted by a light source partition corresponding to the detection element region. The detection assembly is configured to power on, at each of the M moments, only each detection element in a detection element region of the M detection element regions that corresponds to the light source partition used to emit the m first beams. In other words, if the $i^{th}$ light source partition of the light source emits m first beams, the $i^{th}$ detection element region corresponding to the detection assembly is selected. The $i^{th}$ detection element region of the detection assembly is configured to receive an optical echo signal that comes from a corresponding region of the detection surface. In this way, the m first beams emitted by m emitters of the $i^{th}$ light source partition are adjusted by the beam adjustment assembly and then uniformly cover the $i^{th}$ region of the detection surface. In addition, the $i^{th}$ detection element region corresponding to the detection assembly is selected, and the $i^{th}$ detection element region can receive m optical echo signals from the $i^{th}$ region of the detection surface, thereby helping avoid a problem in a conventional technology that an image resolution is low because 160×120 detection elements can be simultaneously started at most.

Based on the TOF sensor module, at each of the M moments, after m first beams emitted by the light source are adjusted by the beam adjustment assembly, the m first beams cover one region of the detection surface. The light source emits m first beams separately at different times, and a corresponding detection element in the detection assembly is selected, thereby resolving a problem that 160×120 detection elements can be simultaneously started at most.

It should be noted that the interval $\Delta_4$ between light source partitions can be effectively controlled by using the M integrally molded light source partitions. A relatively small interval $\Delta_4$ between light source partitions facilitates continuous connection between projection points on the detection surface. The following describes the beneficial effect in detail with reference to specific examples.

Figure 11B:
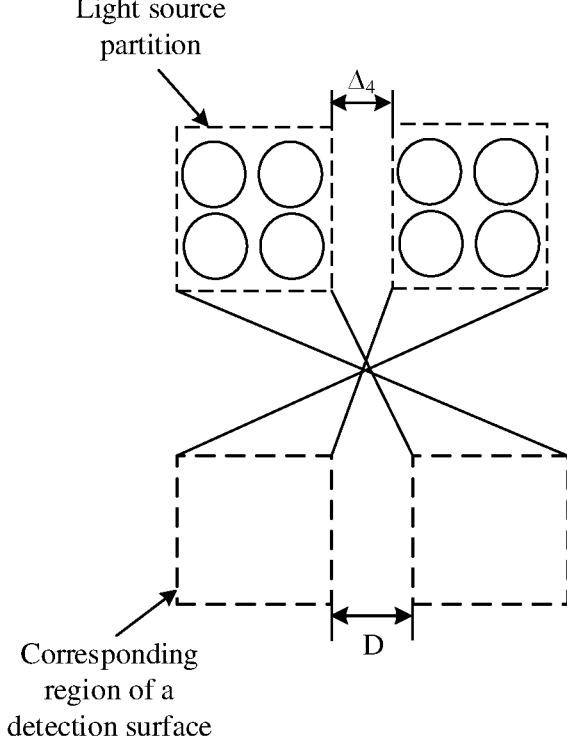
FIG. 11b is a schematic diagram of a relationship between an interval $\Delta_4$ between light source partitions, and an interval D between regions of a detection surface according to this application.

FIG. 11b is a schematic diagram of a relationship between the interval $\Delta_4$ between light source partitions, and an interval D between regions of the detection surface according to this application. The interval D between two adjacent regions of the detection surface is determined by the interval $\Delta_4$ between light source regions. When the interval $\Delta_4$ between light source regions is relatively small, full coverage of the detection surface may be implemented as far as possible by designing a DOE/diffuser to perform divergence at a small angle or through proper defocusing of a collimation mirror (that is, the light source is not disposed on a focal plane of the collimation mirror). It is relatively easy to design a DOE for performing divergence at a small angle. For example, an iterative design manner may be used. When a full angle of emergent light of the DOE is relatively small, a scalar diffraction theory is met, and it is relatively easy to obtain, through iteration, diffracted light with relatively high efficiency and uniformity. Alternatively, when the interval $\Delta_4$ between light source regions is relatively small, full coverage of the detection surface may be implemented through proper defocusing of a collimation mirror. Proper defocusing of the collimation mirror helps control uniformity of projection points that are on the detection surface and to which projection is performed, and can ensure complete coverage of the detection surface.

It should be noted that, when the interval Δ4 between light source partitions is relatively large, and a full angle of emergent light of the DOE/diffuser needs to be designed to be relatively large, a global search/vector design manner needs to be used herein. A calculation amount is relatively large, and it is relatively difficult to control diffraction efficiency and uniformity.

In a possible implementation, the beam adjustment assembly may include beam adjustment partitions. For example, the beam adjustment assembly may be divided into M beam adjustment partitions, and the M light source partitions are in a one-to-one correspondence with the M beam adjustment partitions. For ease of description of the solution, an example in which the beam adjustment partition is a DOE/diffuser is used for description below. In other words, the light source partitions may be in a one-to-one correspondence with DOE/diffuser partitions, that is, one light source partition corresponds to one DOE/diffuser partition.

Figure 11C:
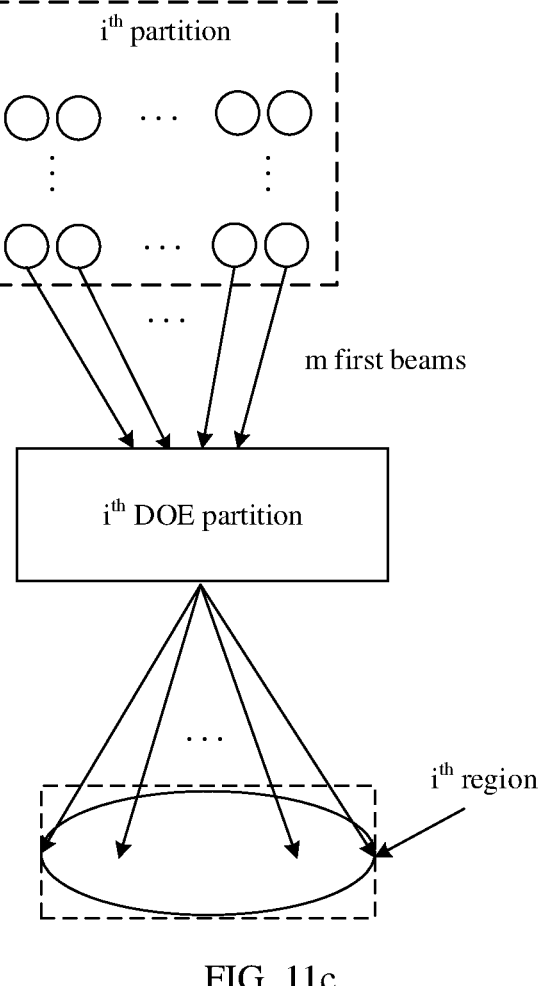
FIG. 11c is a schematic diagram of a location relationship between a DOE partition and a light source partition according to this application.

In a possible implementation, the DOE/diffuser may be located on a side, of the light source, that is close to the detection surface; or the light source and the DOE/diffuser are bonded to form a wafer-level integrated device. FIG. 11c is a schematic diagram of a location relationship between a DOE partition and a light source partition according to this application. In FIG. 11c, the $i^{th}$ light source partition is used as an example. The $i^{th}$ partition emits m first beams, and the m first beams are deflected and homogenized by the DOE and then transmitted to the $i^{th}$ region of the detection surface.

Figure 11D:
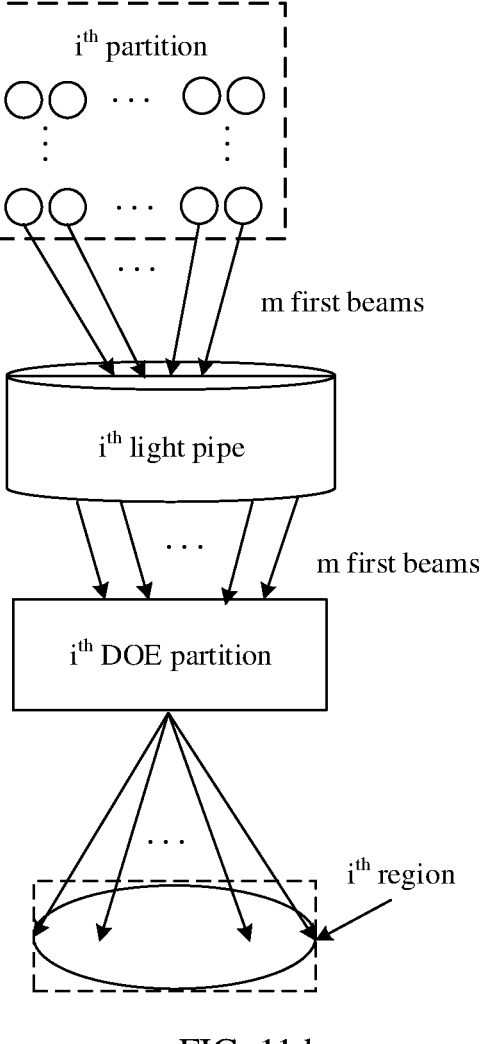
FIG. 11d is a schematic diagram of another location relationship between a DOE partition and a light source partition according to this application.

FIG. 11d is a schematic diagram of another location relationship between a DOE partition and a light source partition according to this application. One light pipe may be fixed for each light source partition. In FIG. 11d, the $i^{th}$ light source partition is used as an example. The $i^{th}$ light source partition emits m first beams. The m first beams are homogenized by the corresponding $i^{th}$ light pipe and then transmitted to the corresponding $i^{th}$ DOE partition. The m first beams are deflected and further homogenized by the corresponding $i^{th}$ DOE partition and then transmitted to the $i^{th}$ region of the detection surface. This prevents the DOE partition from being close to the light source partition, thereby improving utilization of the DOE, and helping reduce difficulty of assembling the TOF sensor module.

It should be noted that the DOE is configured to shape a received beam and deflect an angle of departure. Different light source partitions correspond to different angles of departure. With reference to FIG. 11b, deflection directions of emergent light of different light source partitions are different.

Figure 11E:
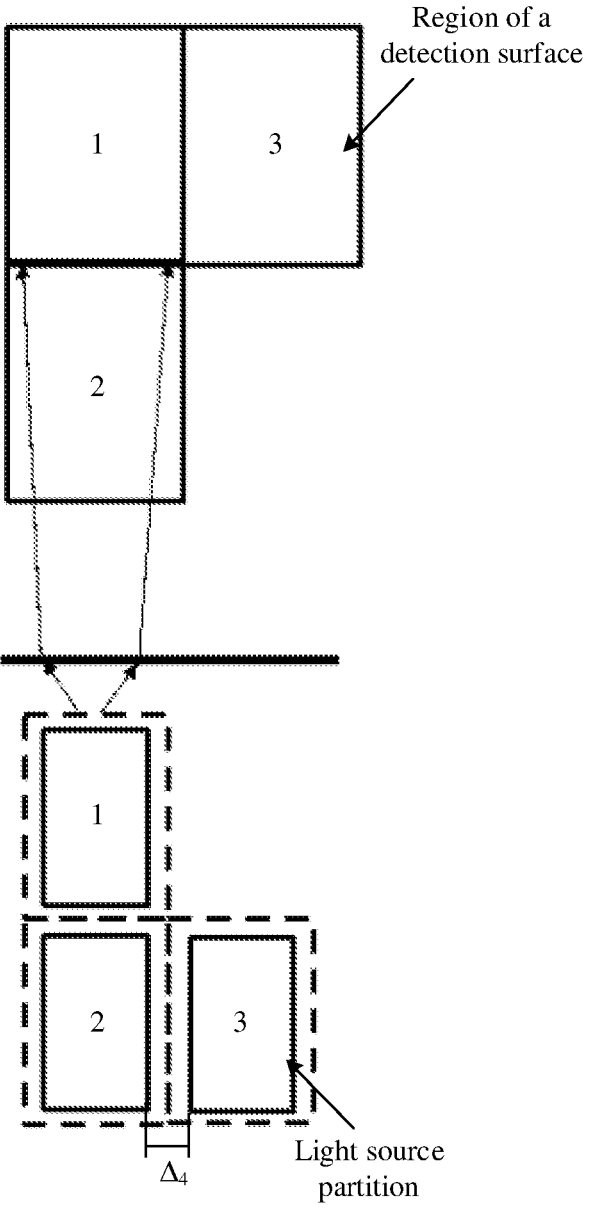
FIG. 11e is a schematic diagram of a relationship between a light source partition and a region of a detection surface according to this application.

Compensation for the interval Δ4 between light source partitions further needs to be considered in a DOE design. As shown in FIG. 11e, three edge light source partitions (1, 2, 3) are used as examples. The DOE is configured to homogenize and deflect a beam that comes from each light source partition so that the beam is transmitted to a corresponding region of the detection surface. Because there is an interval between light source partitions, but there is no gap between regions of the detection surface (that is, a beam needs to fully cover the detection surface), a beam that comes from a light source partition needs to be expanded outward into a region indicated by a dashed-line box, so that light source partitions are in a one-to-one correspondence with regions of the detection surface. For example, a light source partition 1 in a dashed-line box corresponds to a region 1 of the detection surface, a light source partition 2 in a dashed-line box corresponds to a region 2 of the detection surface, a light source partition 3 in a dashed-line box corresponds to a region 3 of the detection surface, and so on.

Based on the structure and the functional principle of the TOF sensor module described above, this application further provides an electronic device. The electronic device may include the TOF sensor module and a fixing structure, and the fixing structure is configured to fix the TOF sensor module. Certainly, the electronic device may further include other components, for example, a processor, a memory, a wireless communication apparatus, a sensor, a touchscreen, and a display.

In this application, the electronic device may be a mobile phone, a tablet computer, a wearable device (for example, a smartwatch), or the like. An example embodiment of the electronic device includes but is not limited to a device using IOS®, Android®, Microsoft®, or another operating system.

Figure 12:
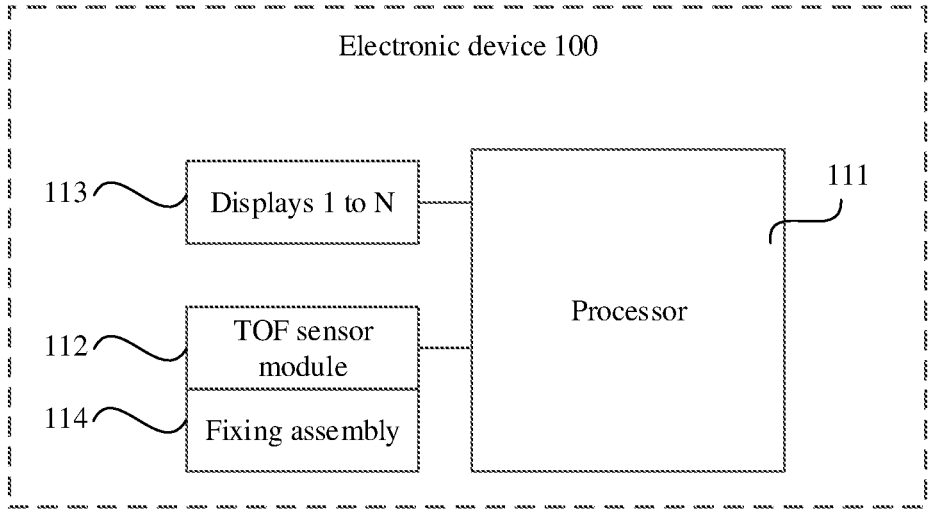
FIG. 12 is a schematic diagram of a structure of an electronic device according to this application.

FIG. 12 is a schematic diagram of a structure of an electronic device according to an embodiment of this application. The electronic device 100 may include a processor 111, a TOF sensor module 112, a display 113, a fixing assembly 114, and the like. It should be understood that the hardware structure shown in FIG. 12 is merely an example. The terminal device to which this application is applicable may include more or fewer components than the electronic device 100 shown in FIG. 12, may combine two or more components, or may have different component configurations. Various components shown in the figure may be implemented by using hardware including one or more signal processing and/or application-specific integrated circuits, software, or a combination of hardware and software.

The processor 111 may include one or more processing units. For example, the processor 111 may include an application processor (AP), a graphics processing unit (GPU), an image signal processor (ISP), a controller, a digital signal processor (DSP), and the like. Different processing units may be independent components, or may be integrated into one or more processors.

For the TOF sensor module 112, refer to the foregoing descriptions. Details are not described herein again.

The display 113 may be configured to display an image and the like. The display 113 may include a display panel. The display panel may be a liquid crystal display (LCD), an organic light-emitting diode (OLED), an active-matrix organic light emitting diode (AMOLED), a flexible light-emitting diode (FLED), miniLED, microLED, micro-OLED, a quantum dot light emitting diode (QLED), or the like. In some embodiments, the electronic device 100 may include one or H displays 113, where H is a positive integer greater than 1.

The fixing assembly 114 is configured to fix the TOF sensor module to the electronic device. For example, the fixing assembly may be a bracket, and the TOF sensor module may be fixed to the electronic device by using the bracket; or the fixing assembly may be a mechanical part formed by another component in the electronic device (for example, a middle frame in a mobile phone); or the fixing assembly may be various adhesives or connectors (for example, solders and screws).

In embodiments of this application, if there is no special description or logical conflict, and terms and/or descriptions in different embodiments are consistent and may be mutually referenced, technical features in the different embodiments may be combined to form a new embodiment based on an internal logical relationship.

In this application, the term "and/or" describes an association relationship between associated objects and may indicate that any one of three relationships may exist. For example, A and/or B may indicate any one of the following cases: Only A exists, both A and B exist, or only B exists, where A and B may be singular or plural. "At least one of the following items (pieces)" or a similar expression thereof means any combination of these items, including a single item (piece) or any combination of a plurality of items (pieces). For example, at least one of a, b, and c (pieces) may represent a, b, c, "a and b", "a and c", "b and c", or "a, b, and c", where a, b, and c may be singular or plural. In the text descriptions of this application, the character "/" usually indicates an "or" relationship between associated objects. It can be understood that, in this application, "uniform" does not mean absolute uniformity, but a specific engineering error may be allowed.

It may be understood that various numerals used in this application are merely differentiated for ease of description, but are not used to limit the scope of embodiments of this application. Sequence numbers of the foregoing processes do not mean execution sequences. The execution sequences of the processes should be determined based on functions and internal logic of the processes. The terms "first", "second", and the like are intended to distinguish between similar objects, but do not necessarily describe a particular order or sequence. Moreover, the terms "include", "have", and any other variant thereof are intended to cover a non-exclusive inclusion, for example, including a series of steps or units. Methods, systems, products, or devices are not necessarily limited to those explicitly listed steps or units, but may include other steps or units that are not explicitly listed or that are inherent to such processes, methods, products, or devices.

Although this application is described with reference to specific features and the embodiments thereof, it is clear that various modifications and combinations may be made to them without departing from the spirit and scope of this application. Correspondingly, the specification and accompanying drawings are merely example description of the solutions defined by the accompanying claims, and are considered as any of or all modifications, variations, combinations or equivalents that cover the scope of this application.

Obviously, a person skilled in the art can make various modifications and variations to this application without departing from the spirit and scope of this application. This application is intended to cover these modifications and variations to embodiments of this application provided that they fall within the scope of protection defined by the following claims in this application and their equivalent technologies.

What is claimed is:

1. A time-of-flight (TOF) sensor module, comprising a light source, a beam adjustment assembly, and a detection assembly, wherein the light source is configured to emit m first beams at each of M moments, and transmit the m first beams to the beam adjustment assembly, wherein both m and M are integers greater than 1, wherein a light source partition used to emit the m first beams at each of the M moments varies;

the beam adjustment assembly is configured to: after adjusting the received m first beams into S second beams, project the S second beams to S regions of a detection surface, wherein the S regions are in a one-to-one correspondence with the S second beams, M projection points that are in a same region of the detection surface and to which projection is performed at the M moments respectively have different locations, and S is an integer greater than m; and the detection assembly is configured to receive S optical echo signals from the detection surface at each of the M moments, and convert the S optical echo signals into S electrical echo signals for storage at each of the M moments, wherein the S optical echo signals are in a one-to-one correspondence with the S second beams, and each of the S optical echo signals is a signal obtained by reflecting a corresponding second beam by the detection surface.

2. The TOF sensor module according to claim 1, wherein the detection assembly comprises K detection elements, and K is an integer greater than or equal to S; and the detection assembly is configured to power on S detection elements corresponding to the S second beams of the K detection elements at each of the M moments.

3. The TOF sensor module according to claim 1, wherein the TOF sensor module further comprises a processing circuit; and the processing circuit is configured to obtain, from the detection assembly, M×S electrical echo signals obtained at the M moments, and determine image information based on the M×S electrical echo signals.

4. The TOF sensor module according to claim 1, wherein S is equal to m×n, and the beam adjustment assembly doesn't include a scanning element and is configured to: when adjusting the received m first beams into the S second beams, adjust transmission directions of the received m first beams, split each of adjusted m first beams into n second beams to obtain m×n second beams, and project the m×n second beams to m×n regions of the detection surface, wherein the m×n regions are in a one-to-one correspondence with the m×n second beams, and n is an integer greater than 1.

5. The TOF sensor module according to claim 4, wherein the detection assembly comprises m×n detection elements, and the m×n detection elements are in a one-to-one correspondence with the m×n regions; and when the detection assembly is configured to receive the S optical echo signals from the detection surface at each of the M moments, and convert the S optical echo signals into the S electrical echo signals for storage at each of the M moments, each of the m×n detection elements is configured to receive an optical echo signal from a corresponding region at each of the M moments, and convert the optical echo signal from the corresponding region into an electrical echo signal for storage at each of the M moments.

6. The TOF sensor module according to claim 4, wherein the beam adjustment assembly comprises a collimation assembly and a beam splitting assembly; and when the beam adjustment assembly is configured to adjust the transmission directions of the received m first beams, and split each of the adjusted m first beams into n second beams, the collimation assembly is configured to adjust an included angle between any two adjacent first beams of the m first beams into a first angle, and transmit the adjusted m first beams to the beam splitting assembly, wherein the first angle is determined based on a total field of view corresponding to the detection surface and a quantity m×n of second beams, and the beam splitting assembly is configured to split each of the adjusted m first beams into n second beams.

7. The TOF sensor module according to claim 4, wherein the light source comprises P emitters, and P is an integer greater than m; and when the light source is configured to emit m first beams at each of the M moments, m emitters selected from the P emitters at preset intervals emit the m first beams at each of the M moments.

8. The TOF sensor module according to claim 7, wherein the beam adjustment assembly comprises a collimation assembly and a beam splitting assembly; and when the beam adjustment assembly is configured to adjust the transmission directions of the received m first beams, and split the adjusted m first beams into n second beams, the collimation assembly is configured to adjust an included angle between any two adjacent first beams of the m first beams into a second angle, and transmit the adjusted m first beams to the beam splitting assembly, wherein the second angle is determined based on a total field of view corresponding to the detection surface and a quantity m of started light sources, and the beam splitting assembly is configured to split each of the adjusted m first beams into n second beams.

9. The TOF sensor module according to claim 1, wherein the light source comprises M light source partitions, and each light source partition comprises m emitters; and when the light source is configured to emit m first beams at each of the M moments, the m emitters in one of the M light source partitions are configured to emit the m first beams at each of the M moments.

10. The TOF sensor module according to claim 9, wherein the M light source partitions are an $M_1 \times M_2$ array, and both $M_1$ and $M_2$ are integers greater than 1;

in a horizontal direction of the $M_1 \times M_2$ array, an included angle between first beams emitted by two adjacent emitters in two adjacent light source partitions is greater than or equal to an angle corresponding to an interval of $M_1$ projection points on the detection surface; and in a vertical direction of the $M_1 \times M_2$ array, an included angle between first beams emitted by two adjacent emitters in two adjacent light source partitions is greater than or equal to an angle corresponding to an interval of $M_2$ projection points on the detection surface.

11. The TOF sensor module according to claim 9, wherein the M light source partitions are integrally molded.

12. An electronic device, comprising a time-of-flight (TOF) sensor module and a fixing assembly, wherein the fixing assembly is configured to fix the TOF sensor module;

wherein the time-of-flight (TOF) sensor module comprises a light source, a beam adjustment assembly, and a detection assembly, wherein the light source is configured to emit m first beams at each of M moments, and transmit the m first beams to the beam adjustment assembly, wherein both m and M are integers greater than 1, wherein a light source partition used to emit the m fist beams at each of the M moments varies;

the beam adjustment assembly is configured to: after adjusting the received m first beams into S second beams, project the S second beams to S regions of a detection surface, wherein the S regions are in a one-to-one correspondence with the S second beams, M projection points that are in a same region of the detection surface and to which projection is performed at the M moments respectively have different locations, and S is an integer greater than m; and the detection assembly is configured to receive S optical echo signals from the detection surface at each of the M moments, and convert the S optical echo signals into S electrical echo signals for storage at each of the M moments, wherein the S optical echo signals are in a one-to-one correspondence with the S second beams, and each of the S optical echo signals is a signal obtained by reflecting a corresponding second beam by the detection surface.

13. The electronic device according to claim 12, wherein the detection assembly comprises K detection elements, and K is an integer greater than or equal to S; and the detection assembly is configured to power on S detection elements corresponding to the S second beams of the K detection elements at each of the M moments.

14. The electronic device according to claim 12, wherein the TOF sensor module further comprises a processing circuit; and the processing circuit is configured to obtain, from the detection assembly, $M \times S$ electrical echo signals obtained at the M moments, and determine image information based on the $M \times S$ electrical echo signals.

15. The electronic device according to claim 12, wherein S is equal to $m \times n$, and the beam adjustment assembly doesn't include a scanning element and is configured to: when adjusting the received m first beams into the S second beams, adjust transmission directions of the received m first beams, split each of adjusted m first beams into n second beams to obtain $m \times n$ second beams, and project the $m \times n$ second beams to $m \times n$ regions of the detection surface, wherein the $m \times n$ regions are in a one-to-one correspondence with the $m \times n$ second beams, and n is an integer greater than 1.

16. The electronic device according to claim 15, wherein the detection assembly comprises $m \times n$ detection elements, and the $m \times n$ detection elements are in a one-to-one correspondence with the $m \times n$ regions; and when the detection assembly is configured to receive the S optical echo signals from the detection surface at each of the M moments, and convert the S optical echo signals into the S electrical echo signals for storage at each of the M moments, each of the $m \times n$ detection elements is configured to receive an optical echo signal from a corresponding region at each of the M moments, and convert the optical echo signal from the corresponding region into an electrical echo signal for storage at each of the M moments.

17. The electronic device according to claim 15, wherein the beam adjustment assembly comprises a collimation assembly and a beam splitting assembly; and when the beam adjustment assembly is configured to adjust the transmission directions of the received m first beams, and split each of the adjusted m first beams into n second beams, the collimation assembly is configured to adjust an included angle between any two adjacent first beams of the m first beams into a first angle, and transmit the adjusted m first beams to the beam splitting assembly, wherein the first angle is determined based on a total field of view corresponding to the detection surface and a quantity $m \times n$ of second beams, and the beam splitting assembly is configured to split each of the adjusted m first beams into n second beams.

18. The electronic device according to claim 15, wherein the light source comprises P emitters, and P is an integer greater than m; and when the light source is configured to emit m first beams at each of the M moments, m emitters selected from the P emitters at preset intervals emit the m first beams at each of the M moments.

19. The electronic device according to claim 12, wherein the light source comprises M light source partitions, and each light source partition comprises m emitters; and when the light source is configured to emit m first beams at each of the M moments, the m emitters in one of the M light source partitions are configured to emit the m first beams at each of the M moments.

20. The electronic device according to claim 19, wherein the M light source partitions are an $M_1 \times M_2$ array, and both $M_1$ and $M_2$ are integers greater than 1;

in a horizontal direction of the $M_1 \times M_2$ array, an included angle between first beams emitted by two adjacent emitters in two adjacent light source partitions is greater than or equal to an angle corresponding to an interval of $M_1$ projection points on the detection surface; and in a vertical direction of the $M_1 \times M_2$ array, an included angle between first beams emitted by two adjacent emitters in two adjacent light source partitions is greater than or equal to an angle corresponding to an interval of $M_2$ projection points on the detection surface.

* * * * *